(12) United States Patent
Yamada et al.

(10) Patent No.: US 11,768,360 B2
(45) Date of Patent: Sep. 26, 2023

(54) IMAGING LENS, IMAGING OPTICAL DEVICE, DIGITAL DEVICE, AND METHOD OF MANUFACTURING IMAGING LENS

(71) Applicant: NIKON CORPORATION, Tokyo (JP)

(72) Inventors: Keiko Yamada, Sakai (JP); Ryosuke Imajima, Sakai (JP); Wataru Tatsuno, Yokohama (JP); Haruo Sato, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 245 days.

(21) Appl. No.: 16/875,275

(22) Filed: May 15, 2020

(65) Prior Publication Data

US 2020/0278518 A1 Sep. 3, 2020

Related U.S. Application Data

(63) Continuation of application No. PCT/JP2018/041421, filed on Nov. 8, 2018.

(30) Foreign Application Priority Data

Nov. 15, 2017 (JP) ................................ 2017-220250

(51) Int. Cl.
*G02B 9/64* (2006.01)
*G02B 13/04* (2006.01)
(Continued)

(52) U.S. Cl.
CPC ............. *G02B 15/143* (2019.08); *G02B 9/64* (2013.01); *G02B 13/04* (2013.01);
(Continued)

(58) Field of Classification Search
CPC ............. G02B 13/001; G02B 13/0015; G02B 13/0045; G02B 13/005; G02B 13/04; G02B 15/143103; G02B 9/64; G02B 9/12
See application file for complete search history.

(56) References Cited

U.S. PATENT DOCUMENTS

2012/0016261 A1   1/2012  Tanaka et al.
2013/0016261 A1   1/2013  Tanaka et al.
(Continued)

FOREIGN PATENT DOCUMENTS

CN       102804021 A     11/2012
JP       2013-186458 A    9/2013
(Continued)

OTHER PUBLICATIONS

International Search Report from International Patent Application No. PCT/JP2018/041421, dated Feb. 12, 2019.
(Continued)

*Primary Examiner* — Cara E Rakowski
(74) *Attorney, Agent, or Firm* — Potomac Law Group, PLLC

(57) ABSTRACT

An imaging lens comprises in order from an object, a first lens group of positive refractive power, a second lens group of positive refractive power, and a third lens group of negative refractive power. In focusing from infinity to a close object, the first lens group is fixed in position, and the second lens group and the third lens group are moved so that the distance between the first lens group and the second lens group is reduced, and the distance between the second lens group and the third lens group is increased. Further, the following conditional expression (1) is satisfied:

$$1.0 < f1/f < 2.5 \qquad (1)$$

where
f1: is the focal length of the first lens group, and
f: the focal length of the entire system.

11 Claims, 18 Drawing Sheets

(51) Int. Cl.
*G02B 15/14* (2006.01)
*G02B 27/00* (2006.01)
*G02B 27/64* (2006.01)

(52) U.S. Cl.
CPC . *G02B 15/143103* (2019.08); *G02B 27/0025* (2013.01); *G02B 27/646* (2013.01)

(56) References Cited

U.S. PATENT DOCUMENTS

| | | | | |
|---|---|---|---|---|
| 2013/0162886 | A1* | 6/2013 | Morooka | G02B 15/143107 359/684 |
| 2015/0098138 | A1* | 4/2015 | Shirasuna | G02B 9/64 359/749 |
| 2015/0309393 | A1* | 10/2015 | Kuzuhara | G02B 13/0015 348/360 |
| 2016/0252706 | A1* | 9/2016 | Yamanaka | G02B 27/646 359/754 |
| 2016/0282590 | A1* | 9/2016 | Saito | G02B 13/04 |
| 2019/0079305 | A1* | 3/2019 | Ichimura | G02B 13/02 |

FOREIGN PATENT DOCUMENTS

| | | |
|---|---|---|
| JP | 2015-034899 A | 2/2015 |
| WO | WO 2018/135000 A1 | 7/2018 |

OTHER PUBLICATIONS

Office Action dated Jul. 30, 2021, in Chinese Patent Application No. 201880073193.X.
Office Action dated Oct. 26, 2021, in Japanese Patent Application No. 2017-220250.
International Preliminary Report on Patentability from International Patent Application No. PCT/JP2018/041421, dated May 28, 2020.
Office Action dated Apr. 29, 2022, in Chinese Patent Application No. 201880073193.X.

* cited by examiner

FIG.2
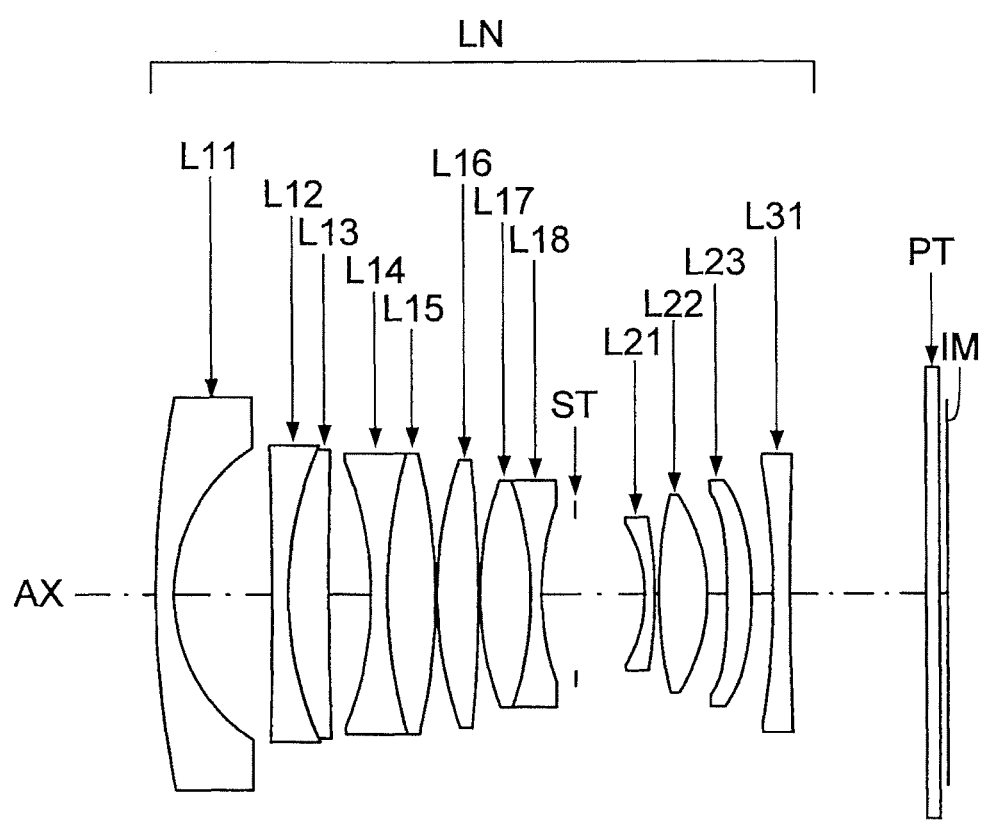
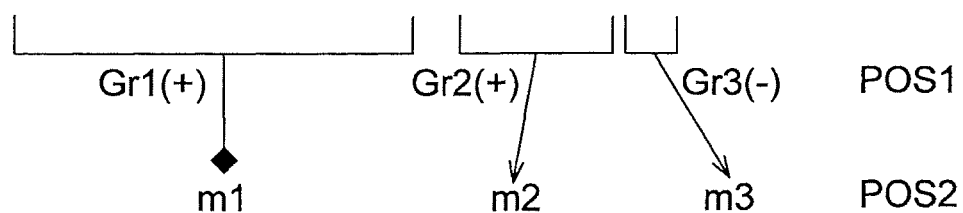

FIG.3
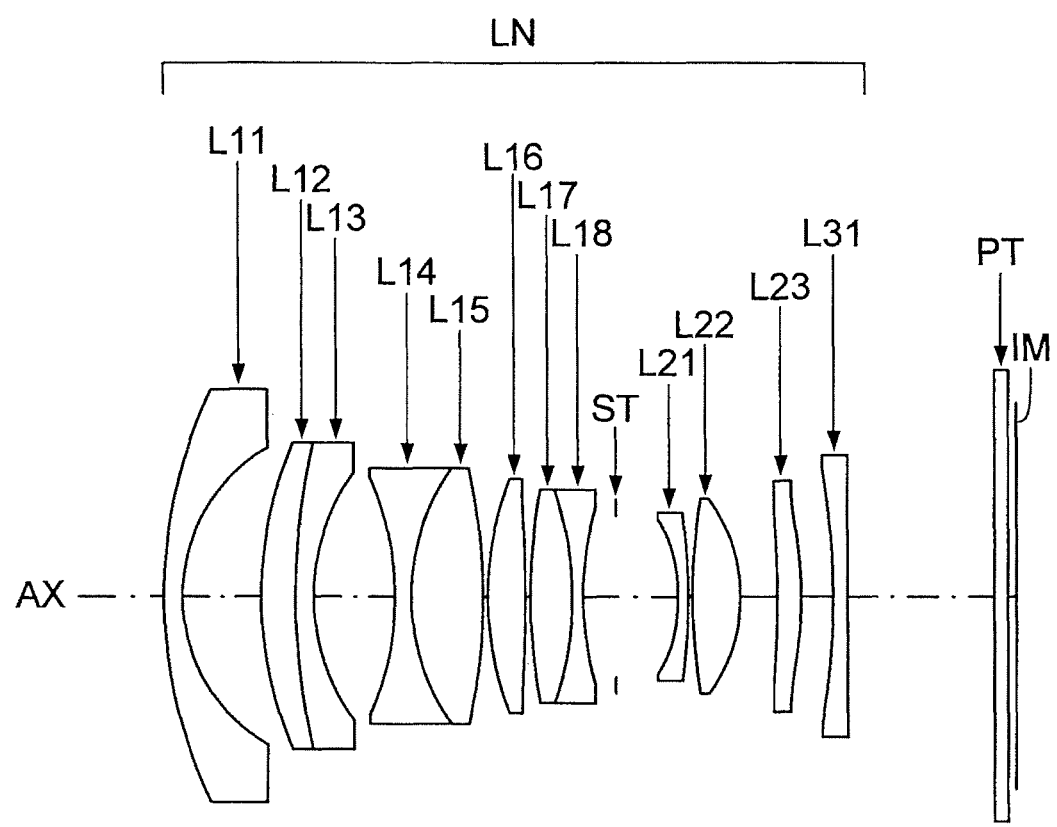
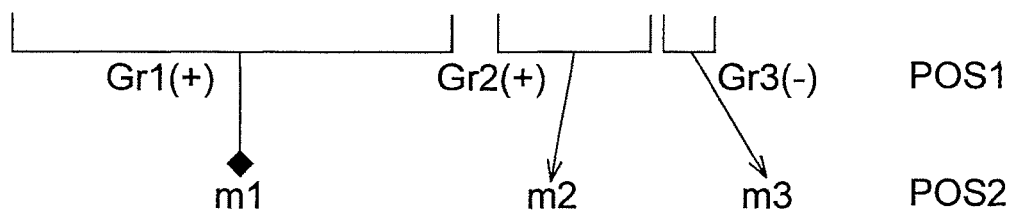

FIG.4
EX4
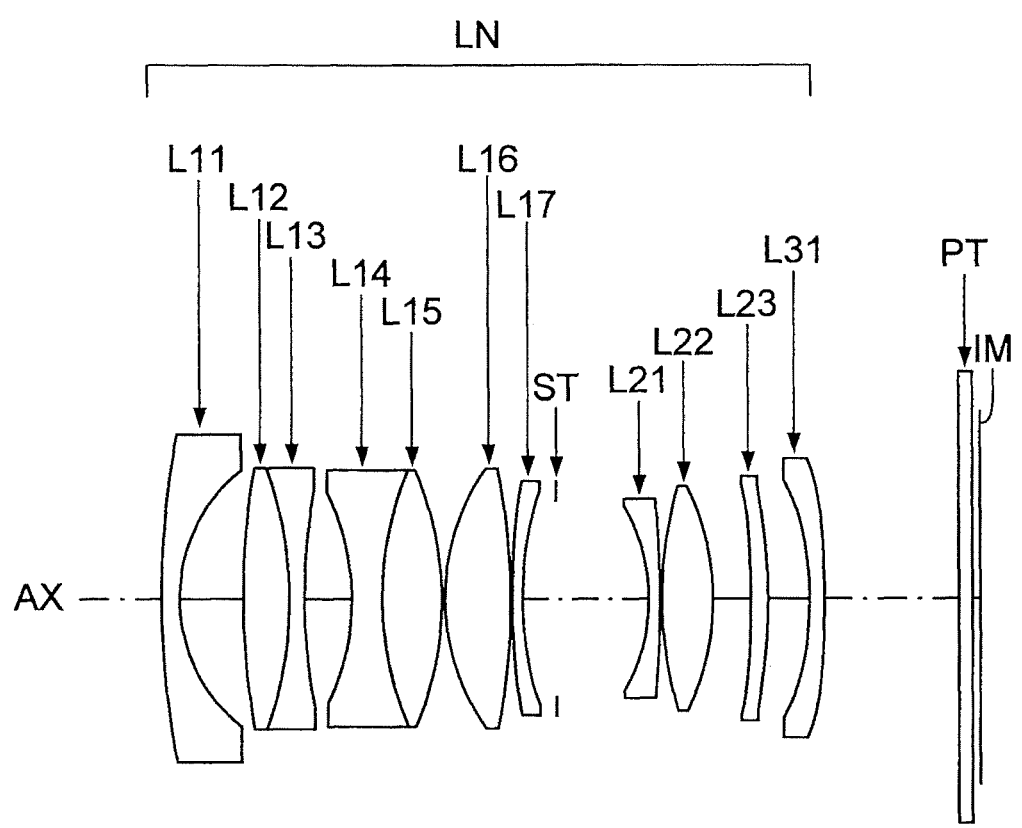
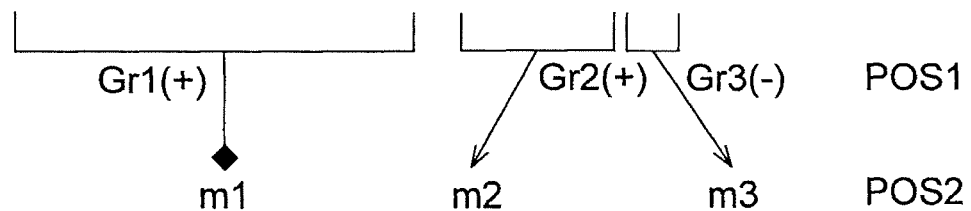

FIG. 6
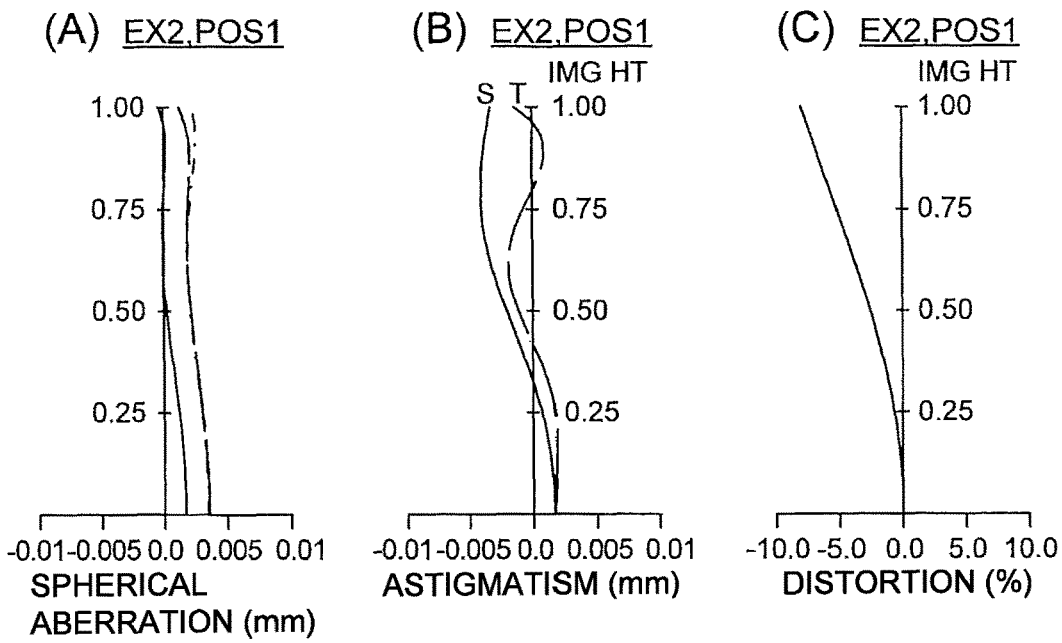
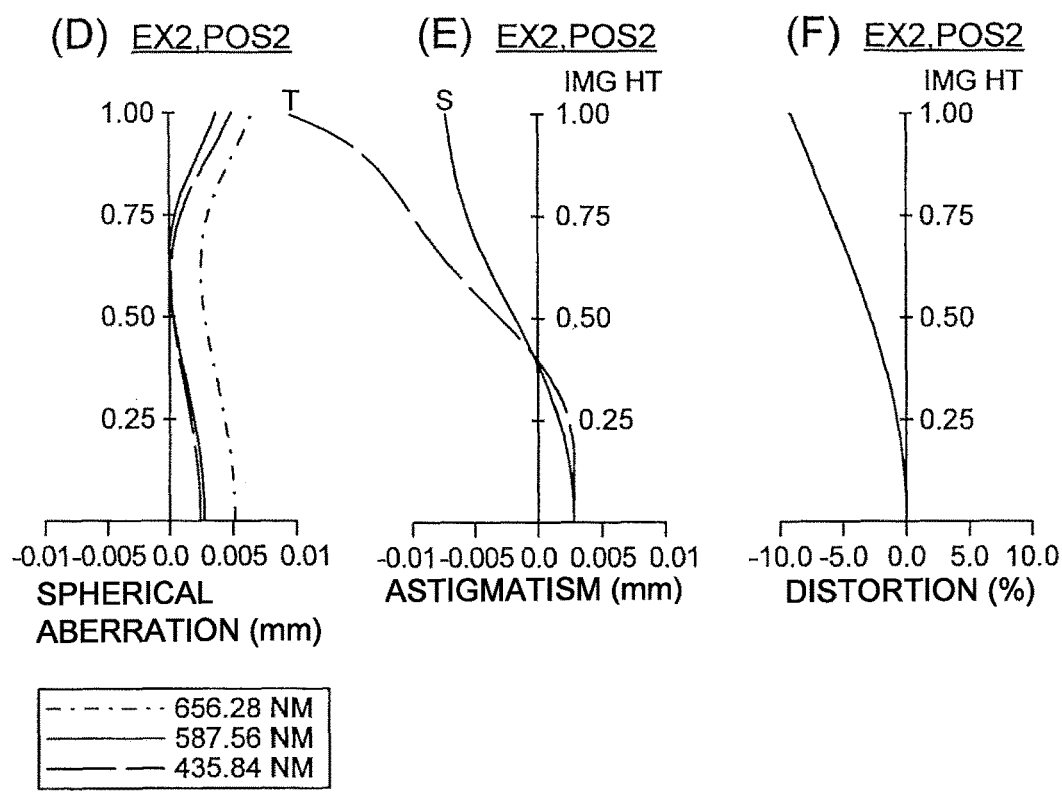

FIG.7
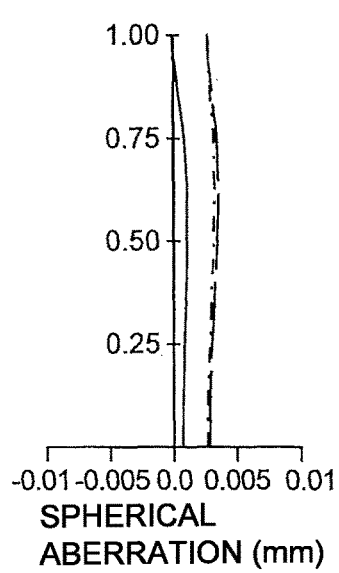
(A) EX3,POS1
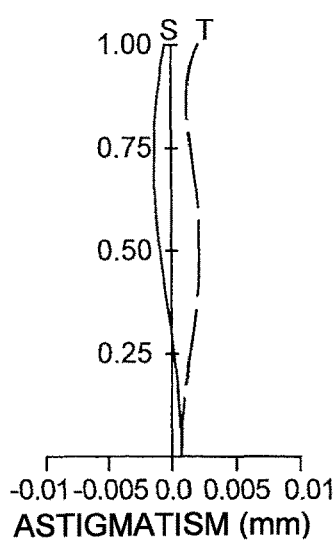
(B) EX3,POS1
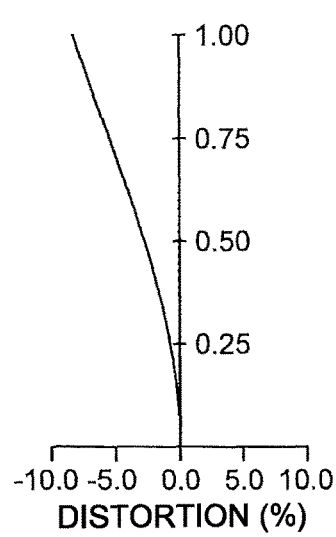
(C) EX3,POS1
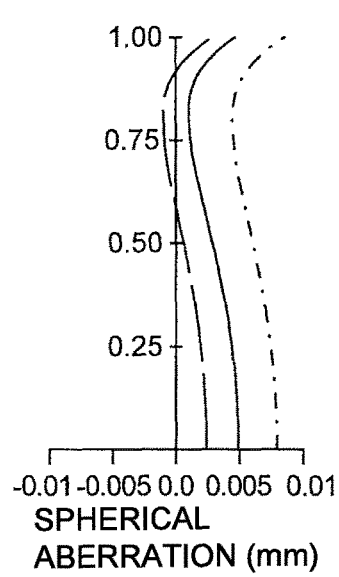
(D) EX3,POS2
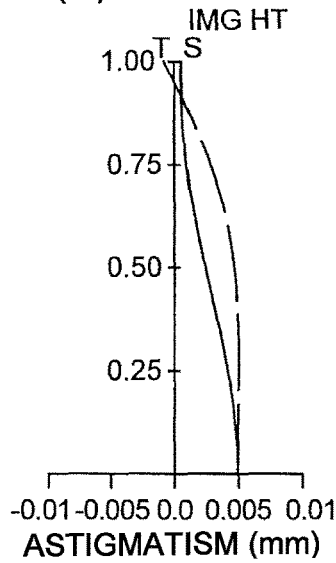
(E) EX3,POS2
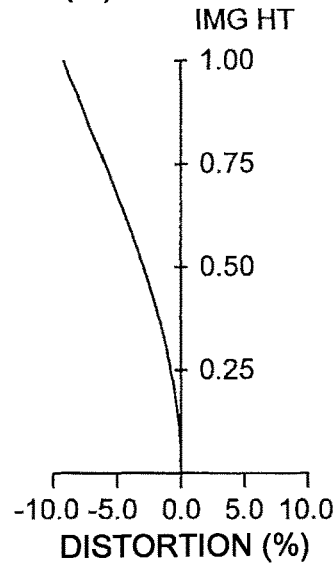
(F) EX3,POS2

IMAGING LENS, IMAGING OPTICAL DEVICE, DIGITAL DEVICE, AND METHOD OF MANUFACTURING IMAGING LENS

TECHNICAL FIELD

The present invention relates to an imaging lens, an imaging optical device, a digital device, and a method for manufacturing an imaging lens. For example, the present invention relates to a compact, wide-angle, large-aperture imaging lens suitable for an interchangeable lens digital camera that captures an image of a subject with an imaging element, an imaging optical device that outputs, in the form of an electrical signal, the image of the subject captured by the imaging lens and the imaging element, a digital device with an image input function such as a digital camera equipped with the imaging optical device, and a method of manufacturing an imaging lens.

TECHNICAL BACKGROUND

In recent years, digital cameras have become popular as interchangeable lens cameras. With a digital camera, the user can see a photographed image with unity magnification on the monitor. For this reason, from the infinity end to the close-up end, more improvement in Modulation Transfer Function (MTF) performance has been demanded.

Some of the interchangeable mirrorless lens cameras, in which the flip-up mirror is removed from the single-lens reflex camera, cannot use the phase difference autofocus (AF), which has been the mainstream among conventional single-lens reflex cameras. Such a camera uses so-called contrast AF in which focusing is performed by scanning a focusing group to search for a point where the contrast becomes maximum.

In the case of the phase difference AF, the amount of movement of the focusing group necessary for focusing can be calculated using information from the AF sensor, so that the focusing group can be moved according to that amount. In contrast, with contrast AF, the information obtained from the AF sensor is only the contrast value obtained at that moment. For this reason, the focusing operation is performed by moving the focusing group and searching for a point where the contrast becomes maximum, while reading the change in contrast at each time. Consequently, when the amount of movement of the focusing group made until focusing is obtained is compared between the contrast AF and the phase difference AF, the former case exhibits an overwhelmingly larger amount.

For example, to make a large-aperture imaging lens having an F value of 2 or less compatible with the contrast AF, a reduction in the weight of the focusing group is a key to speed up the AF. Accordingly, it is necessary to achieve both a reduction in the weight of the focusing group for speeding up the AF and an improvement in the MTF performance (aberration performance) from the infinity end to the close-up end. Examples of a large-aperture imaging lens include the one proposed in Patent Document 1. Examples of imaging lens made to improve the MTF performance from the infinity end to the close-up end include the one proposed in Patent Document 2.

PRIOR ART LIST

Patent Document

Patent Document 1: Japanese Laid-Open Patent Publication No. 2013-186458(A)
Patent Document 2: Japanese Laid-Open Patent Publication No. 2015-34899(A)

SUMMARY OF THE INVENTION

Problems to be Solved by the Invention

The large-aperture imaging lens proposed in Patent Document 1 lacks correction of aberration at the time of close-up focusing. The imaging lens proposed in Patent Document 2 employs a floating focusing method in which a plurality of groups are driven upon focusing in order to improve MTF performance from the infinity end to the close-up end. However, since the effective aperture of the focusing group is large, a sufficient reduction in the weight of the focusing group is not achieved.

The present invention has been made in view of such circumstances. An object of the present invention is to provide an imaging lens that has both a bright F-number and a lighter focusing group and can yield a uniform image quality over the entire image in which aberrations are corrected well from the infinity end to the close-up end; an imaging optical device and a digital device having the same; and a method of manufacturing an imaging lens.

Means to Solve the Problems

In order to achieve the aforementioned object, an imaging lens of a first aspect of the invention comprises:

in order from an object, a first lens group of positive refractive power, a second lens group of positive refractive power, and a third lens group of negative refractive power, wherein in focusing from infinity to a close object, the first lens group is fixed in position, and the second lens group and the third lens group are moved so that the distance between the first lens group and the second lens group is reduced, and the distance between the second lens group and the third lens group is increased, and the following conditional expression (1) is satisfied:

$$1.0 < f1/f < 2.5 \tag{1}$$

where
f1: the focal length of the first lens group, and
f: the focal length of the entire system.

In an imaging lens of a second aspect of the invention according to the first aspect of the invention, the following conditional expressions (2) and (3) are satisfied:

$$1.2 < f2/f < 3.0 \tag{2}$$

$$1.2 < |f3/f2| < 4.0 \tag{3}$$

where
f2: the focal length of the second lens group,
f3: the focal length of the third lens group, and
f: the focal length of the entire system.

In an imaging lens of a third aspect of the invention according to the first or second aspect of the invention, the following conditional expression (4) is satisfied:

$$0.1 < |d\_2Gr/d\_3Gr| < 1.5 \tag{4}$$

where d_2Gr: the amount of movement of the second lens group during focusing from infinity to an arbitrary object distance, and d_3Gr: the amount of movement of the third lens group during focusing from infinity to an arbitrary object distance.

In an imaging lens of a fourth aspect of the invention according to any one of the first to third aspects of the invention, the following conditional expression (5) is satisfied:

$$0.1 < d\_npr1/f1 < 0.6 \qquad (5)$$

where d_npr1: the distance along an optical axis from the lens surface of the first lens group closest to the image to the rear principal point of the first lens group, and f1: the focal length of the first lens group.

In an imaging lens of a fifth aspect of the invention according to any one of the first to fourth aspects of the invention, the second lens group comprises at least one negative lens and at least one positive lens.

In an imaging lens of a sixth aspect of the invention according to any one of the first to fifth aspects of the invention, the second lens group comprises a positive lens that satisfies the following conditional expression (6):

$$\theta g, F - (-0.0018vd + 0.6484) > 0.009 \qquad (6)$$

where

θg, F: a partial dispersion ratio of a lens material,

θg, F=(Ng−NF)/(NF−NC)

Ng: a refractive index for g line,

NF: a refractive index for F line,

NC: a refractive index for C line, and vd: an Abbe number related to the d line of the lens material.

In an imaging lens of a seventh aspect of the invention according to any one of the first to sixth aspects of the invention, the lens of the third lens group closest to an object is concave on the object side.

In an imaging lens of an eighth aspect of the invention according to any one of the first to seventh aspects of the invention, a stop is disposed between the first lens group and the second lens group.

An imaging optical device of a ninth aspect of the invention comprises: an imaging lens according to any one of the first to eighth aspects of the invention; and an imaging element that converts an optical image formed on an imaging surface to an electric signal, wherein the imaging lens is provided so that an optical image of a subject is formed on an imaging surface of the imaging element.

A digital device of a tenth aspect of the invention comprises the imaging optical device according to the ninth aspect, thereby having at least one of an added function of capturing a still image of a subject and an added function of capturing a moving image of a subject.

A method of manufacturing an imaging lens of an eleventh aspect of the invention is a method of manufacturing an imaging lens comprising:

in order from an object, a first lens group of positive refractive power, a second lens group of positive refractive power, and a third lens group of negative refractive power, wherein in focusing from infinity to a close object, the first lens group is fixed in position, and the second lens group and the third lens group are moved so that the distance between the first lens group and the second lens group is reduced, and the distance between the second lens group and the third lens group is increased, and the first to third lens groups are disposed in a lens barrel so that the following conditional expression (1) is satisfied:

$$1.0 < f1/f < 2.5 \qquad (1)$$

where f1: the focal length of the first lens group, and f: the focal length of the entire system.

Advantageous Effects of the Invention

The present invention provides an imaging lens that has both a bright F-number and a lighter focusing group and can yield a uniform image quality over the entire image in which aberrations are corrected well from the infinity end to the close-up end; and a related imaging optical device. Use of the imaging lens or the imaging optical device in a digital device (for example, a digital camera) can add a compact high-performance image input function to the digital device.

BRIEF DESCRIPTION OF THE DRAWINGS

FIG. 2 is a lens configuration diagram of a second embodiment (Example 2).

FIG. 3 is a lens configuration diagram of a third embodiment (Example 3).

FIG. 4 is a lens configuration diagram of a fourth embodiment (Example 4).

FIG. 6 is a longitudinal aberration graph of Example 2.

FIG. 7 is a longitudinal aberration graph of Example 3.

DESCRIPTION OF THE EMBODIMENTS

Figure 1:
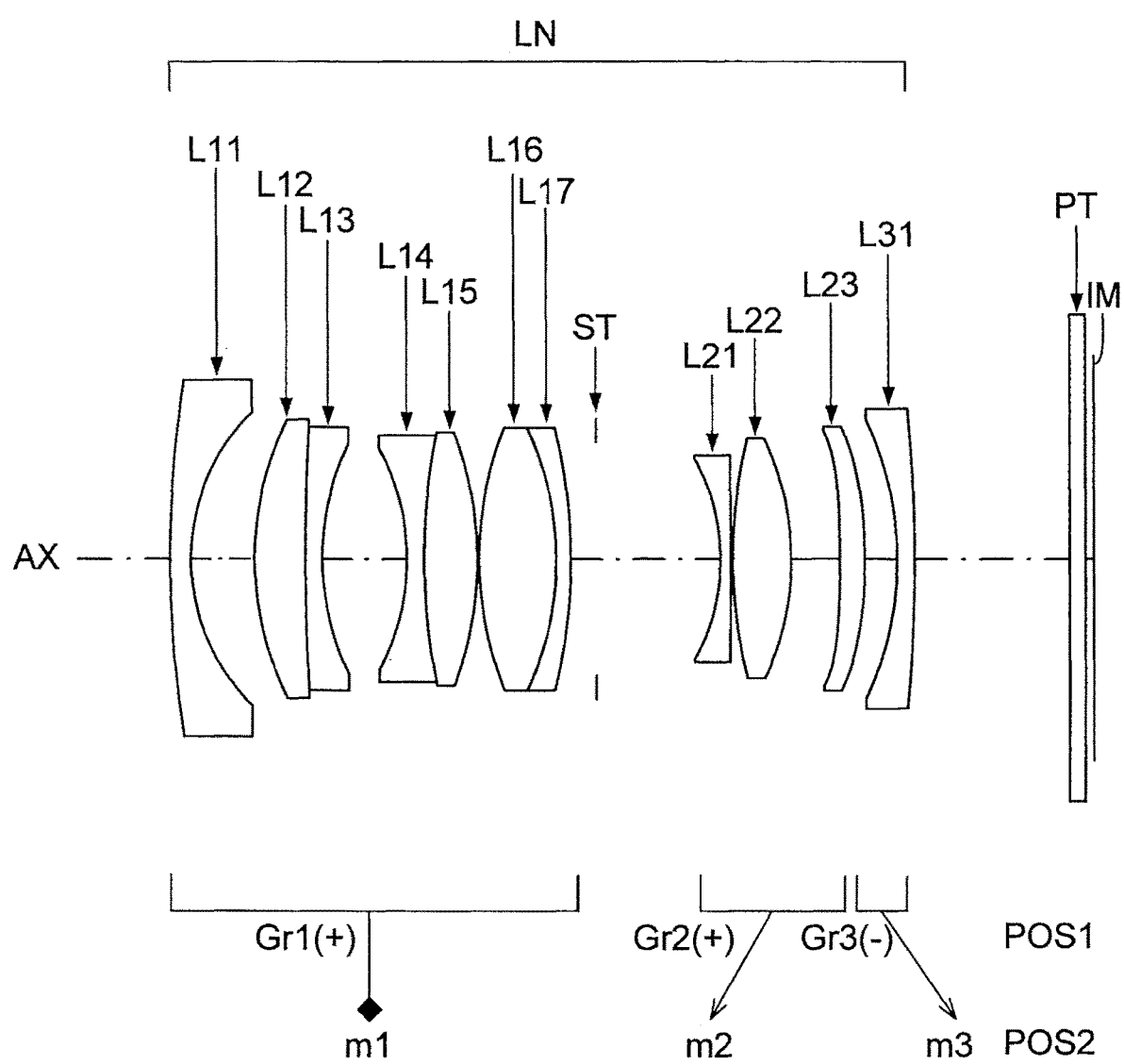
FIG. 1 is a lens configuration diagram of a first embodiment (Example 1).
Figure 5:
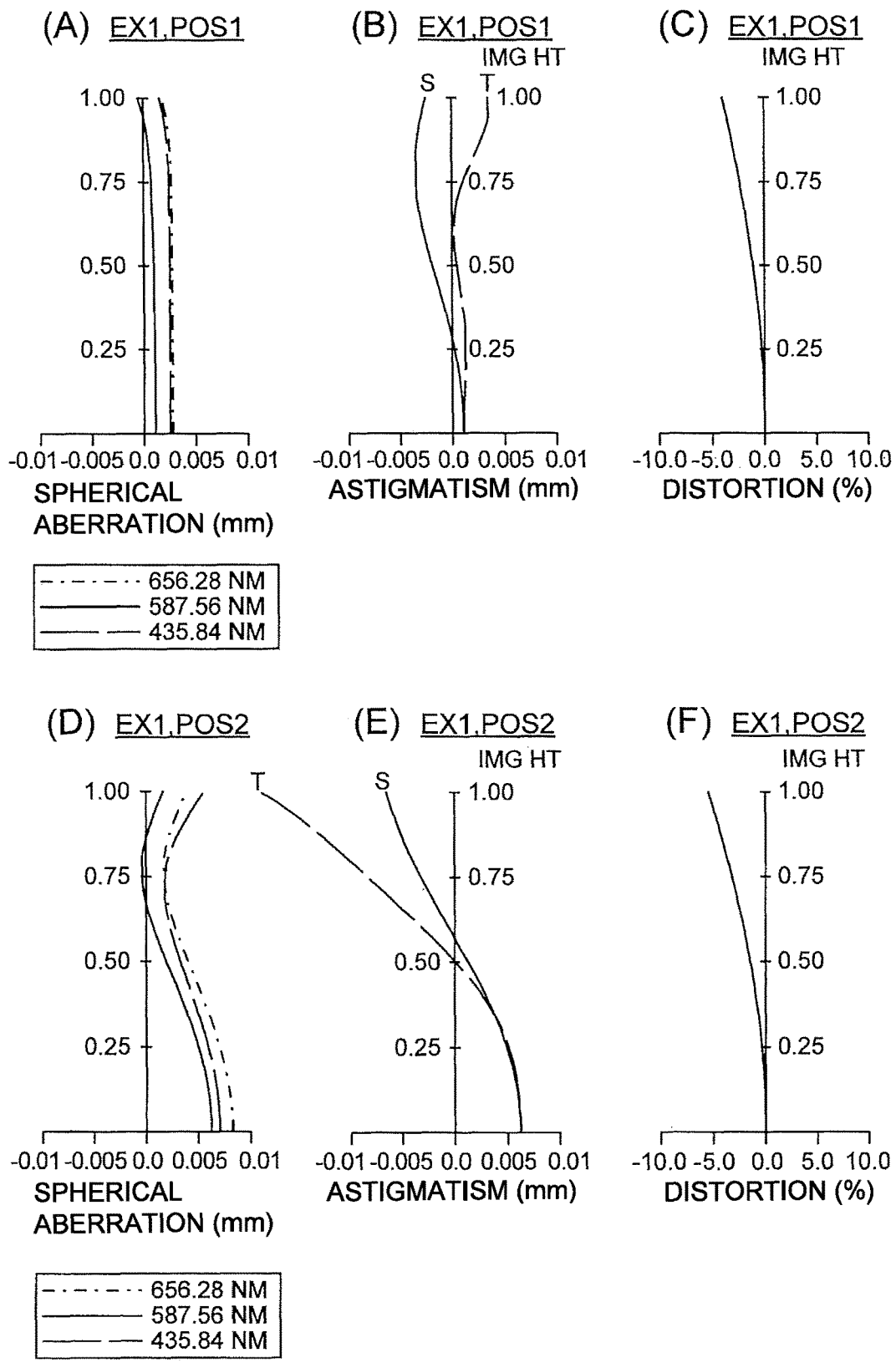
FIG. 5 is a longitudinal aberration graph of Example 1.
Figure 8:
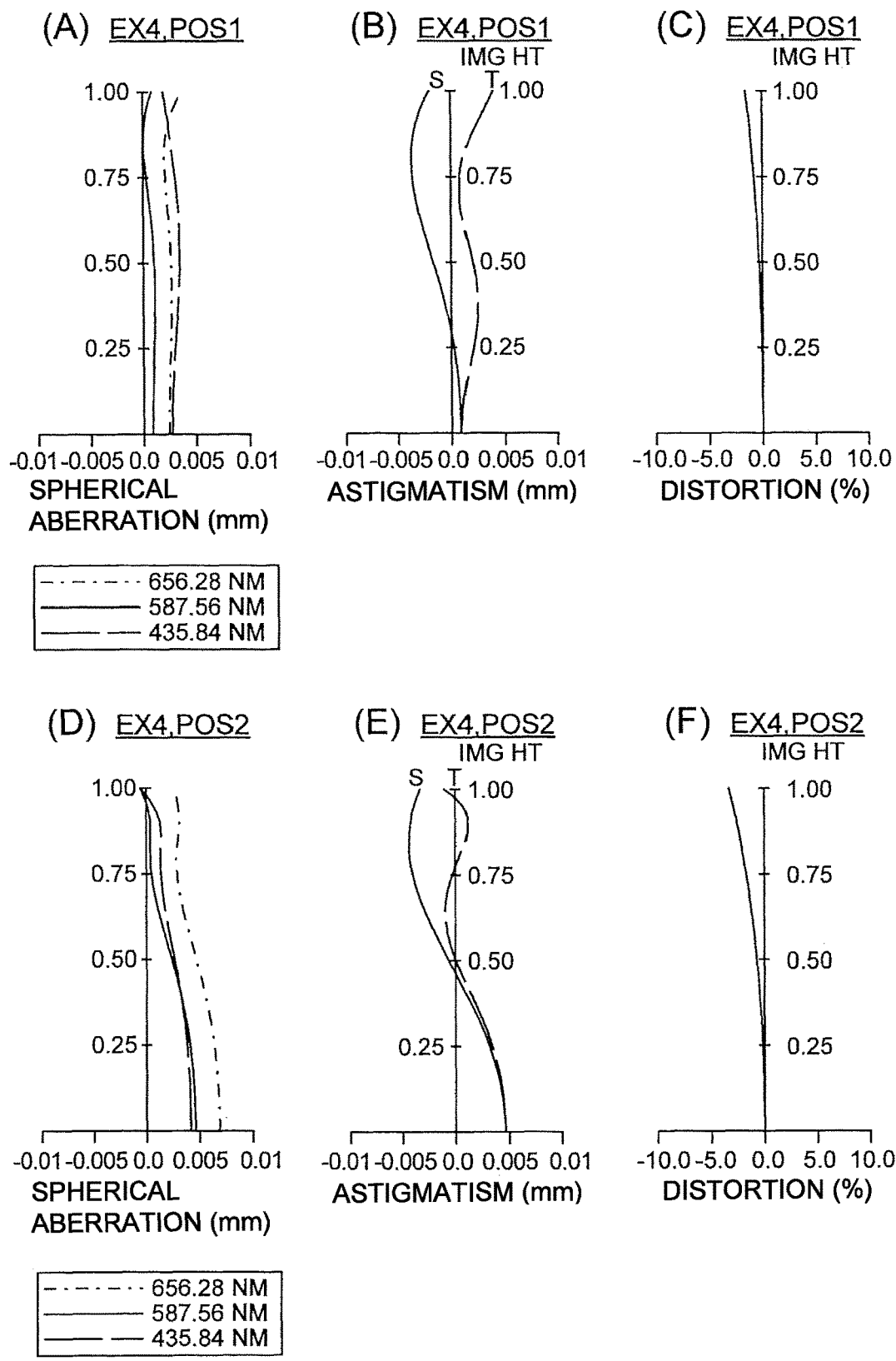
FIG. 8 is a longitudinal aberration graph of Example 4.
Figure 9:
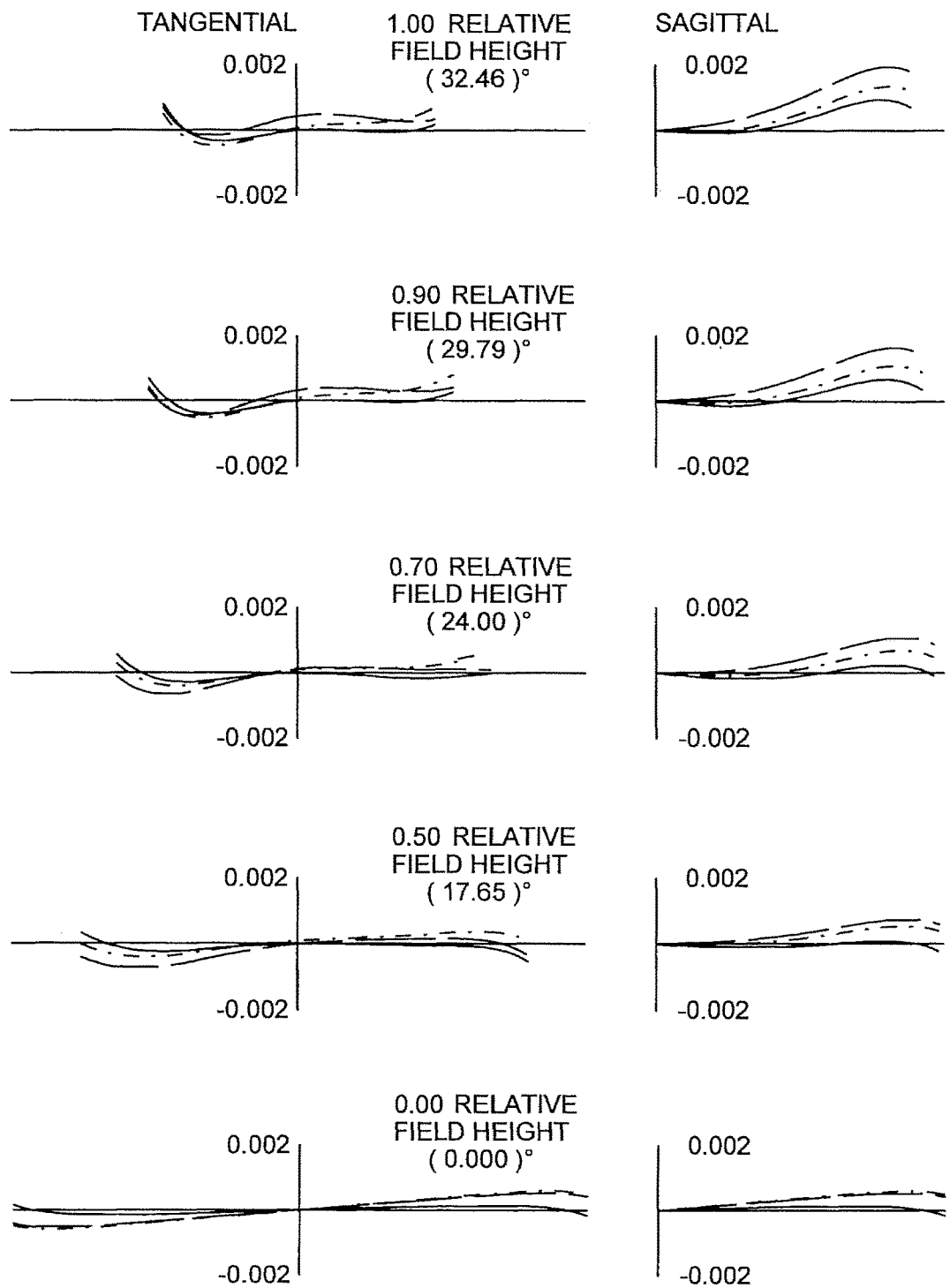
FIG. 9 is a lateral aberration graph in the first focusing position of Example 1.
Figure 10:
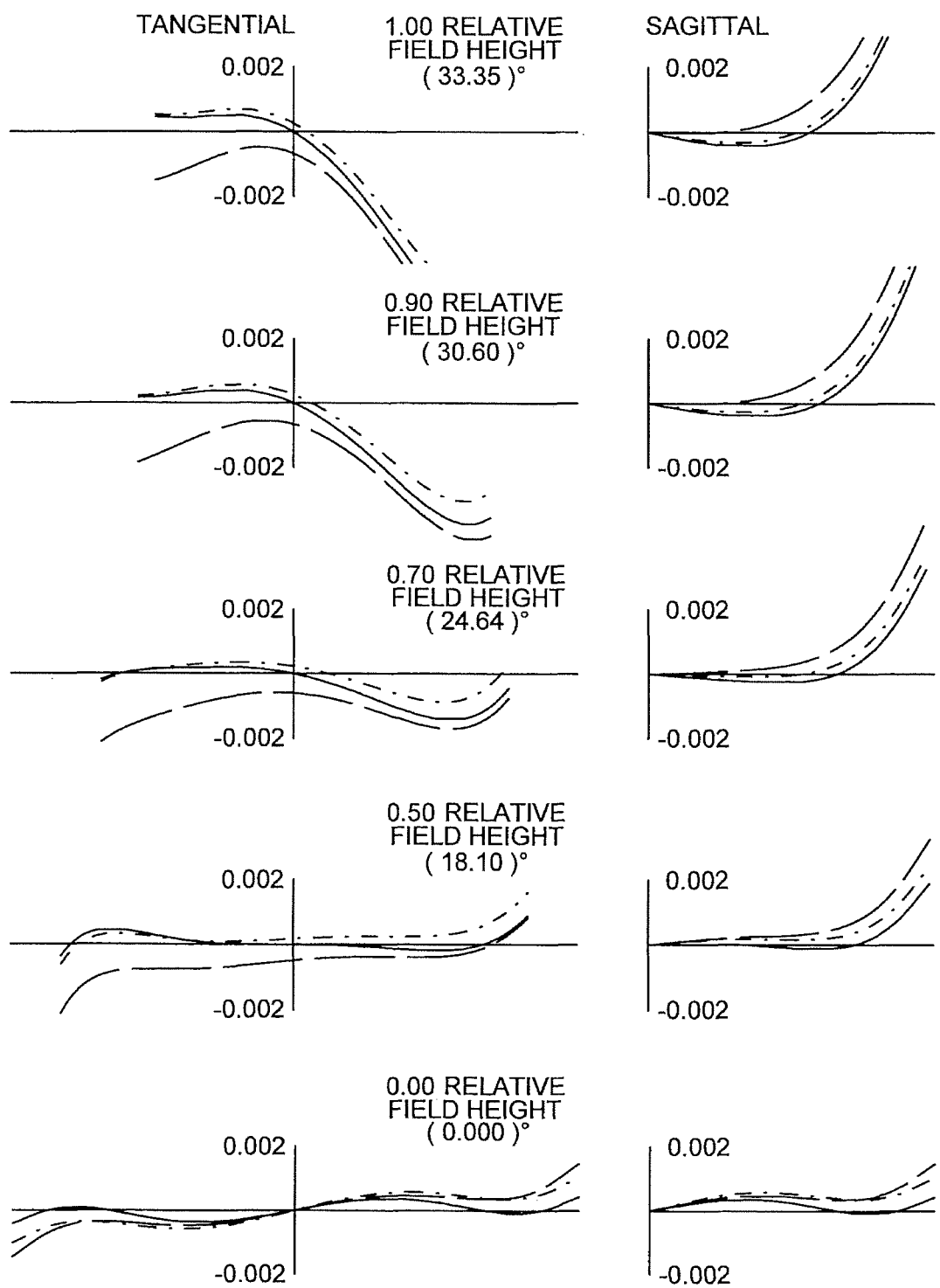
FIG. 10 is a lateral aberration graph in the second focusing position of Example 1.
Figure 11:
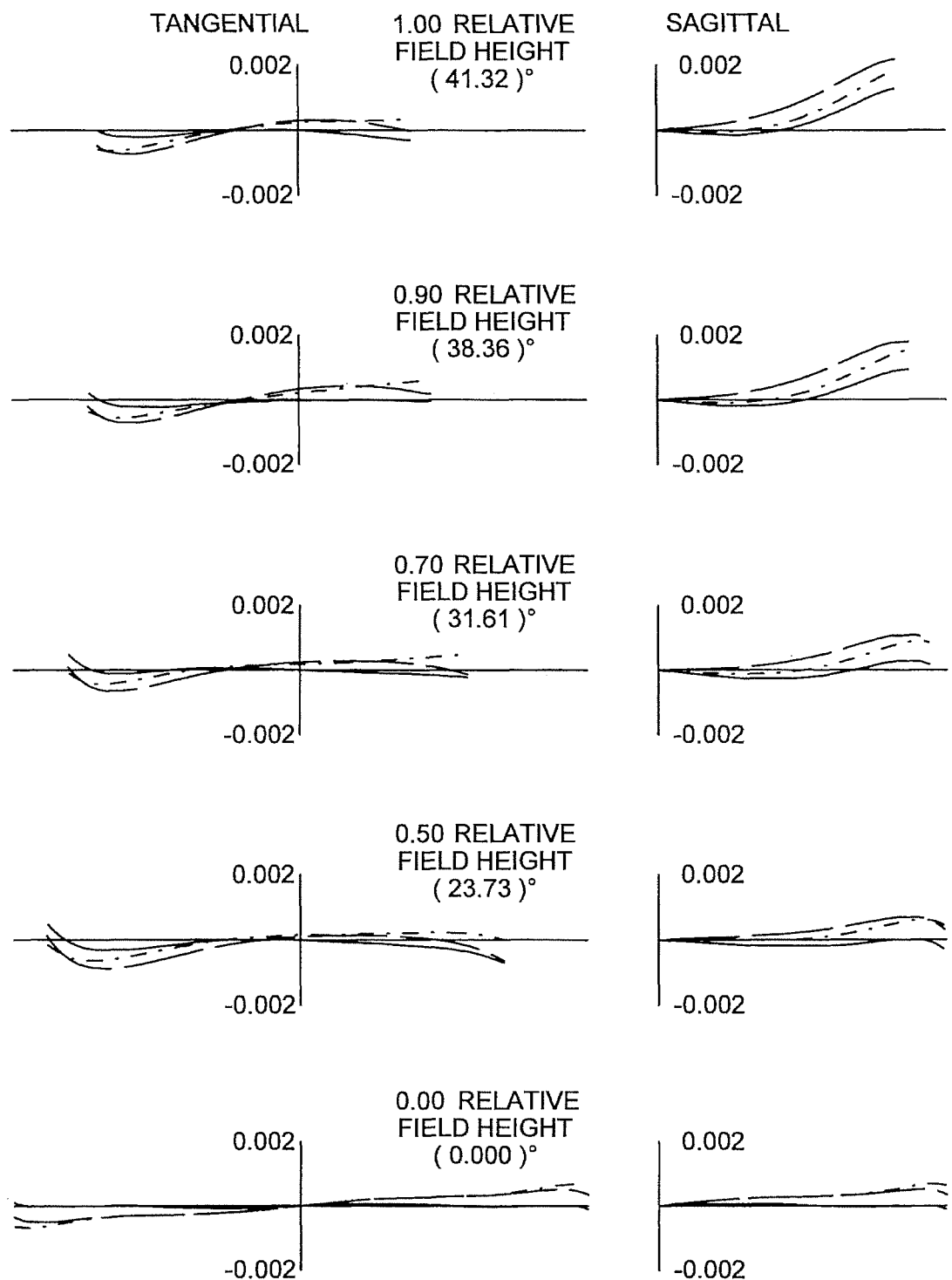
FIG. 11 is a lateral aberration graph in the first focusing position of Example 2.
Figure 12:
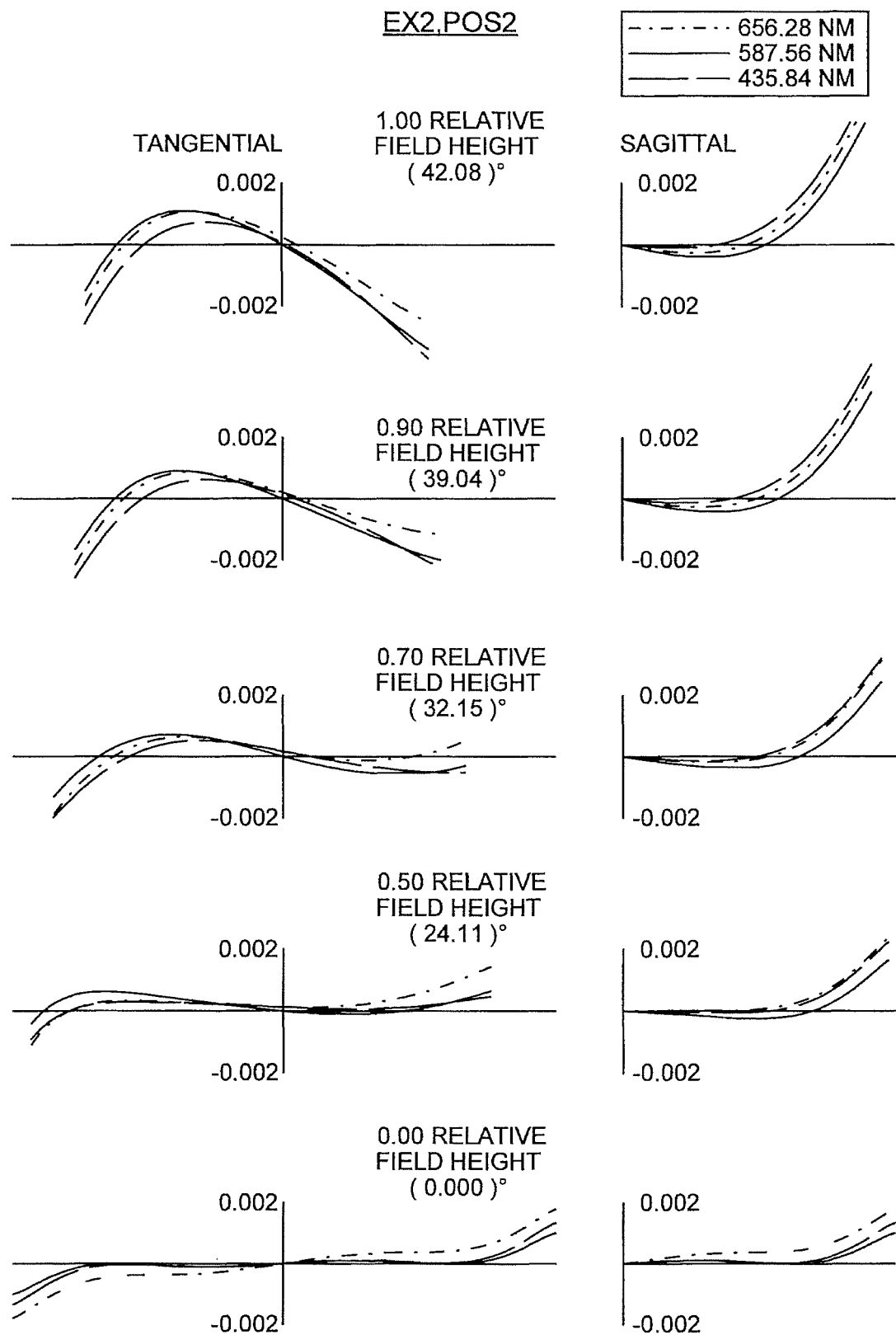
FIG. 12 is a lateral aberration graph in the second focusing position of Example 2.
Figure 13:
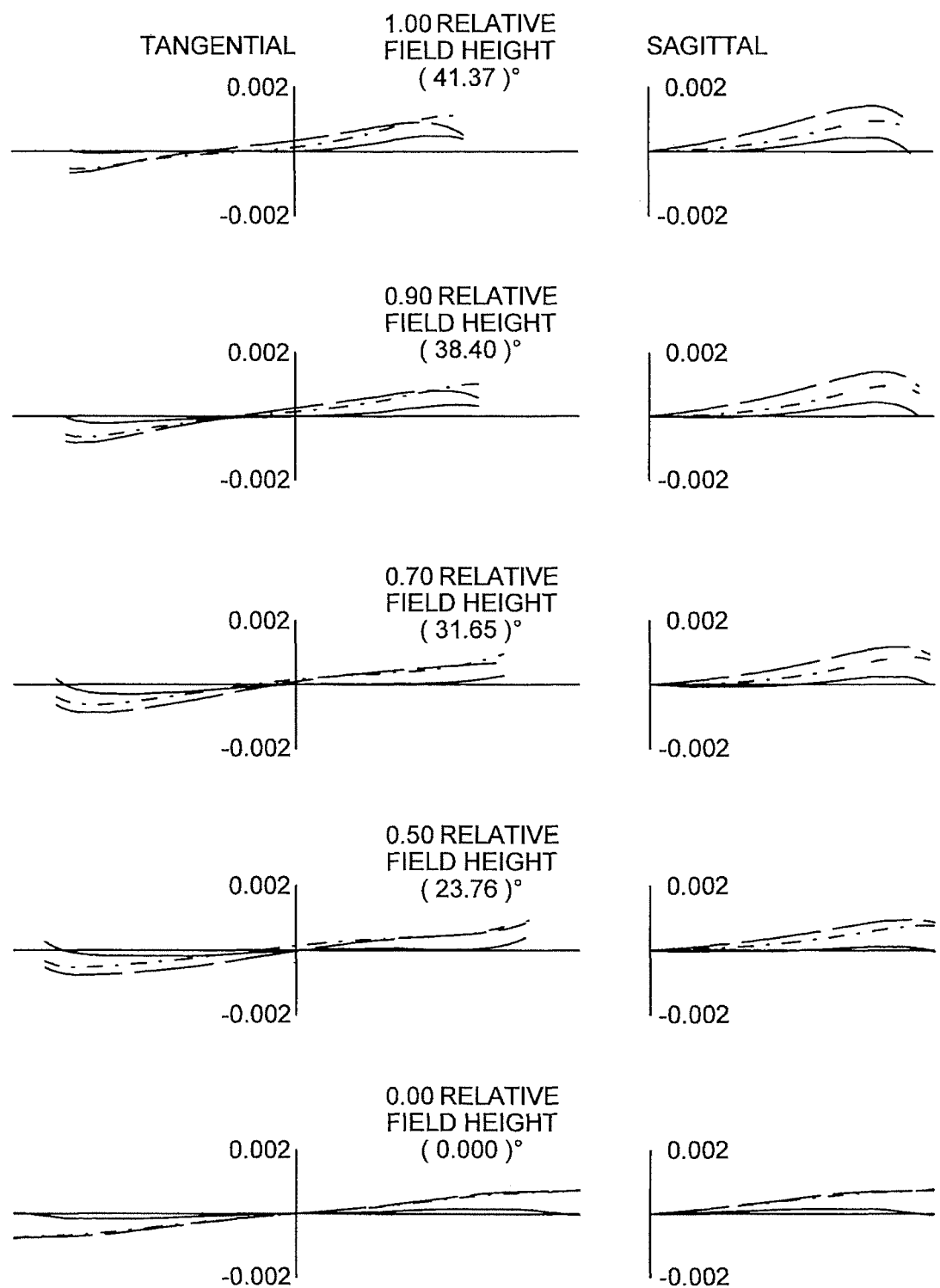
FIG. 13 is a lateral aberration graph in the first focusing position of Example 3.
Figure 14:
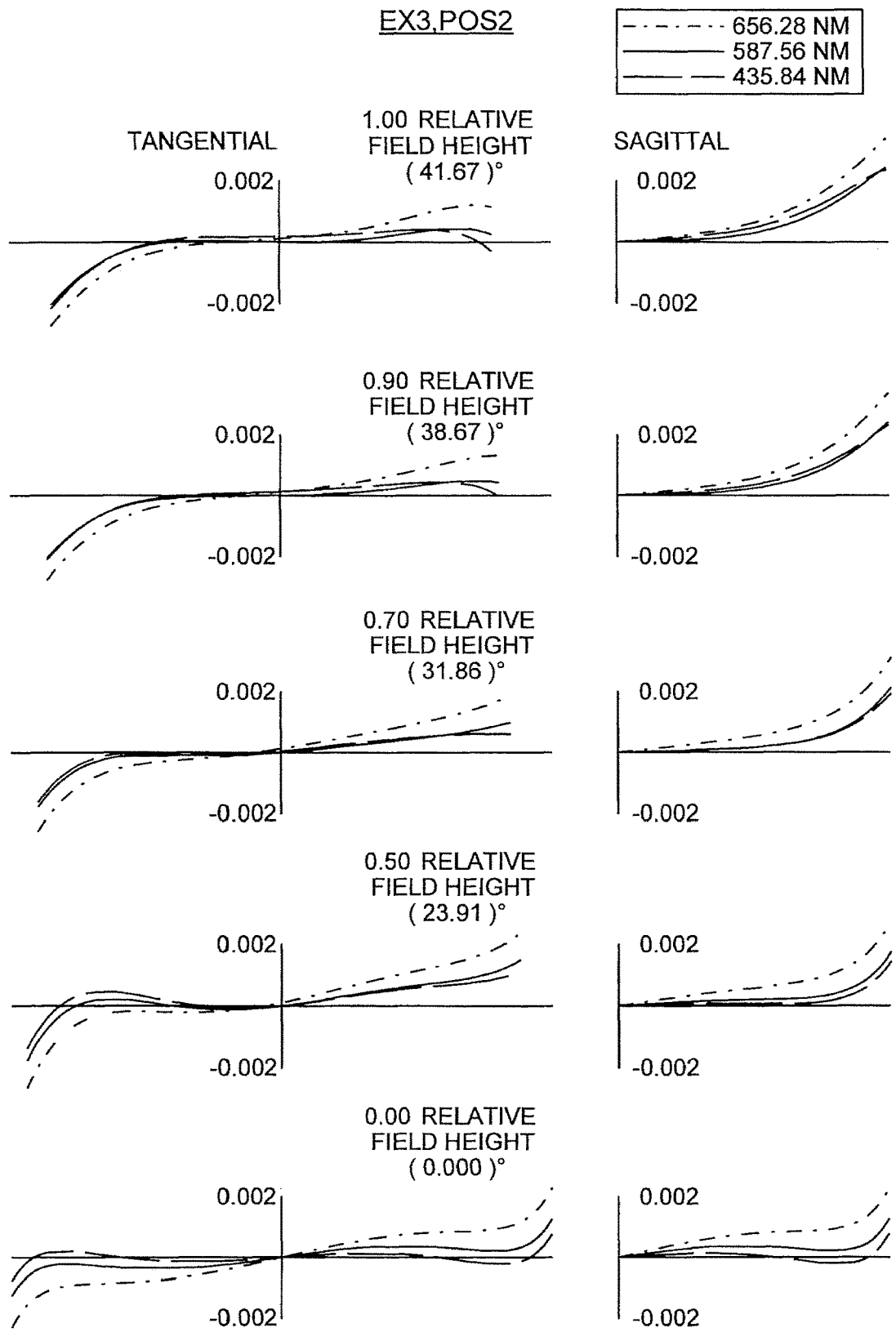
FIG. 14 is a lateral aberration graph in the second focusing position of Example 3.
Figure 15:
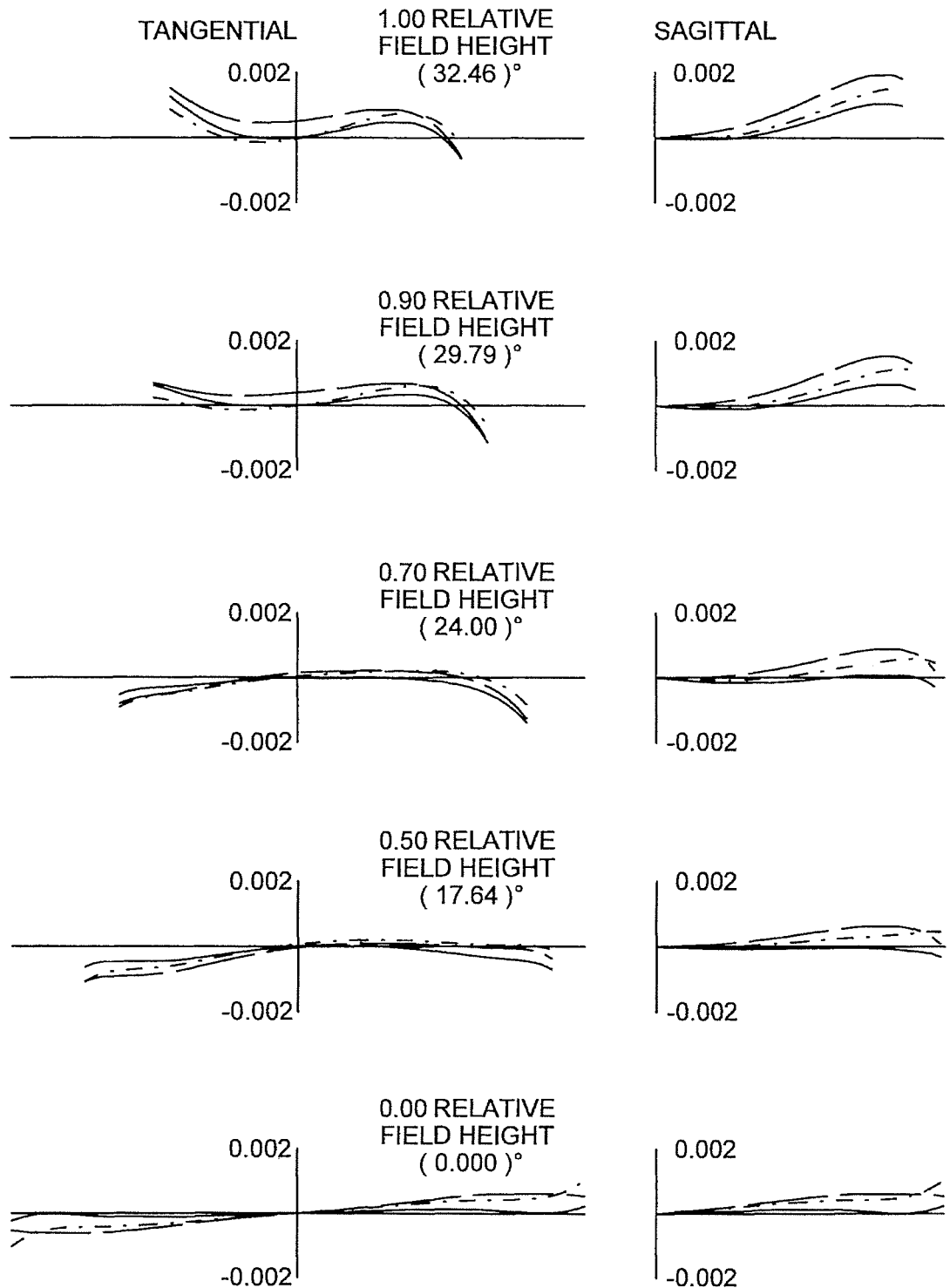
FIG. 15 is a lateral aberration graph in the first focusing position of Example 4.
Figure 16:
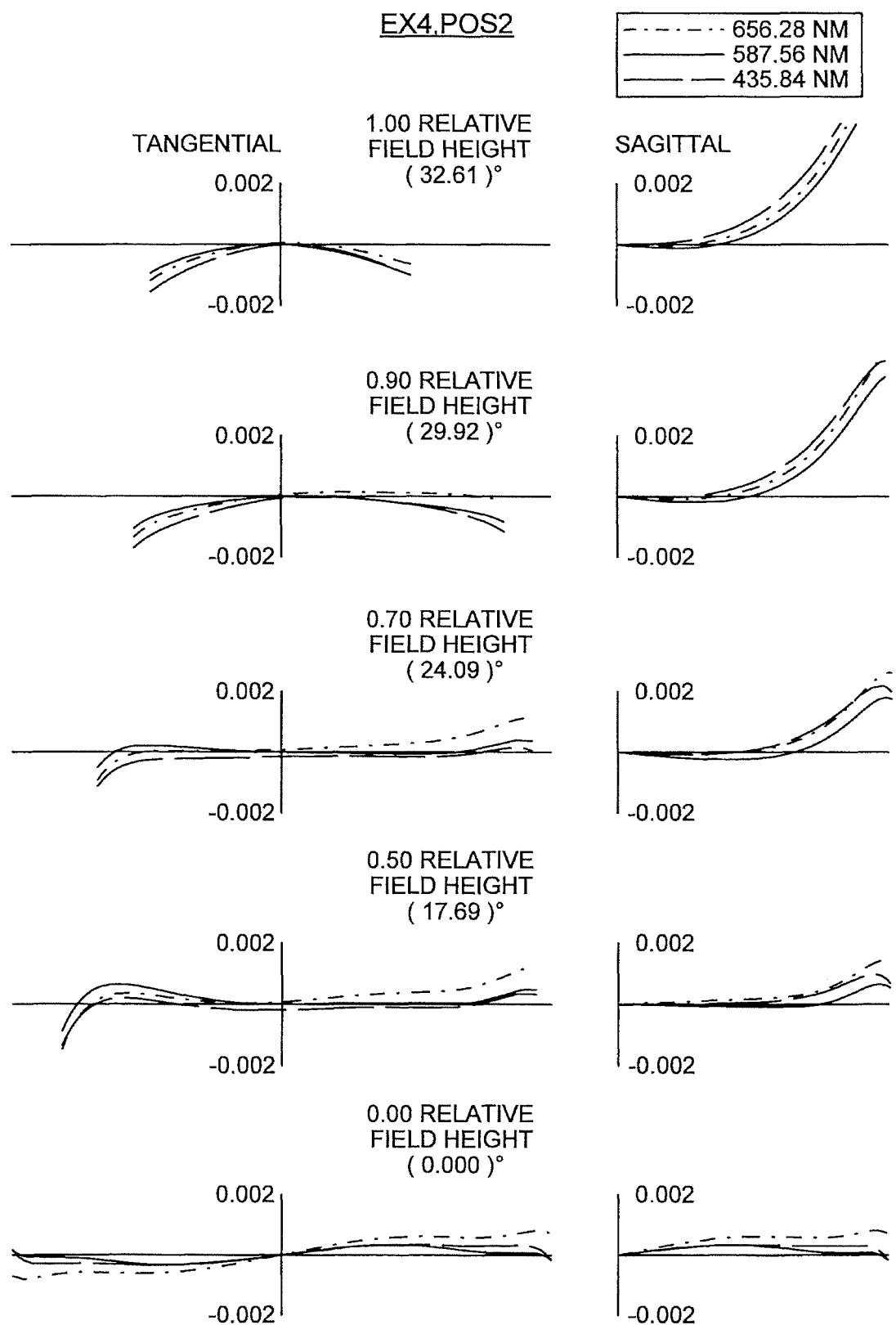
FIG. 16 is a lateral aberration graph in the second focusing position of Example 4.

An imaging lens, an imaging optical device, and a digital device according to an embodiment of the present invention will now be described. In an imaging lens according to an embodiment of the present invention comprises: in order from the object side, a first lens group of positive refractive power, a second lens group of positive refractive power, and a third lens group of negative refractive power (power is an amount defined by the reciprocal of a focal length), wherein in focusing from infinity to a close object, the second lens group and the third lens group move so that the first lens group is fixed in position, the distance between the first lens group and the second lens group is reduced, and the distance between the second lens group and the third lens group is increased.

The imaging lens satisfies the following conditional expression (1).

$$1.0 < f1/f < 2.5 \tag{1}$$

where
f1: the focal length of the first lens group, and
f: the focal length of the entire system.

When a positive first lens group, a positive second lens group, and a negative third lens group are arranged in this order from the object side, and focusing is performed by driving the second lens group and the third lens group, fluctuations in field curves and spherical aberrations during focusing can be canceled by the second and third lens groups. Consequently, the aberration from the infinity end to the close-up end can be corrected well while the number of lenses constituting the focusing group is suppressed. Additionally, when the path of the movement of the second and third lens groups is set so that the distance between the first and second lens groups is reduced and the distance between the second and third lens groups is increased, fluctuations in field curves or spherical aberrations can be suppressed most effectively. Since the second lens group and the third lens group share the function of focusing, fluctuations in aberrations during focusing can be suppressed while an increase in the number of lenses constituting each group is suppressed, so that the weight of the focusing groups is reduced. In particular, in the case of a large-aperture imaging lens in which the effective apertures of the focusing groups are large and fluctuations in spherical aberrations during focusing are significant, the effect of reducing the weight of the focusing groups is remarkable.

Conditional expression (1) defines the power of the first lens group. When the power exceeds the lower limit of the conditional expression (1), the power of the first lens group does not become too strong, and an increase in the negative refractive power of the third lens group is suppressed, which suppresses fluctuations in field curves caused by the movement of the third lens group during focusing. When the power falls below the upper limit of conditional expression (1), the power of the first lens group does not become too weak, and expansion of the entire length is prevented and the positive refractive power is appropriately shared with the second lens group; thus, spherical aberration, field curves, and the like due to focusing can be suppressed.

With the above-described characteristic configuration, the imaging lens has both a bright F-number and a lighter focusing group and can yield a uniform image quality over the entire image in which aberrations are corrected well from the infinity end to the close-up end; and an imaging optical device including the same can be achieved. Use of the imaging lens or the imaging optical device in a digital device (for example, a digital camera) can add a lightweight and compact high-performance image input function to the digital device, contributing to, for example, a reduction in the size and cost of the digital device and an increase in the performance and functionality of the digital device. For example, since the imaging lens having the above-described characteristic configuration is suitable as an interchangeable lens for a digital camera and a video camera, a lightweight, compact, and high-performance interchangeable lens that is convenient to carry around can be achieved. The conditions for obtaining these effects with a good balance and achieving higher optical performance, lighter weight, smaller size, and the like will be described below.

The following conditional expression (1a) is preferably satisfied.

$$1.0 < f1/f < 2.0 \tag{1a}$$

The conditional expression (1a) defines a more preferable conditional range based on the aforementioned viewpoints, within the conditional range defined by the conditional expression (1). Therefore, when the conditional expression (1a) is preferably satisfied, the aforementioned effects can be enhanced.

Regarding the second and third lens groups, the following conditional expressions (2) and (3) are preferably satisfied.

$$1.2 < f2/f < 3.0 \tag{2}$$

$$1.2 < |f3/f2| < 4.0 \tag{3}$$

where
f2: the focal length of the second lens group,
f3: the focal length of the third lens group, and
f: the focal length of the entire system.

When the power exceeds the lower limit of the conditional expression (2), the power of the second lens group does not become too strong, and fluctuations in spherical aberrations caused by the movement of the second lens group during focusing can be suppressed. When the power falls below the upper limit of the conditional expression (2), an increase in the amount of movement of the second lens group can be prevented while fluctuations in field curves caused by the movement of the second lens group during focusing is suppressed.

When the power exceeds the lower limit of the conditional expression (3), the power of the third lens group does not become too strong, and an increase in the amount of focusing movement of each group is prevented and fluctuations in field curves due to focusing is suppressed, while the amount of coma aberration in the off-axis light flux is reduced. When the power falls below the upper limit of the conditional expression (3), the power of the third lens group does not become too weak, leading to a configuration effective in suppressing fluctuations in field curves during focusing.

The following conditional expression (2a) is more preferably satisfied.

$$1.4 < f2/f < 2.0 \tag{2a}$$

The conditional expression (2a) defines a more preferable conditional range based on the aforementioned viewpoints, within the conditional range defined by the conditional expression (2). Therefore, when the conditional expression (2a) is preferably satisfied, the aforementioned effects can be enhanced.

The following conditional expression (3a) is more preferably satisfied.

$$1.2 < |f3/f2| < 3.5 \tag{3a}$$

The conditional expression (3a) defines a more preferable conditional range based on the aforementioned viewpoints, within the conditional range defined by the conditional expression (3). Therefore, when the conditional expression (3a) is preferably satisfied, the aforementioned effects can be enhanced.

Regarding the second and third lens groups, the following conditional expression (4) is preferably satisfied.

$$0.1 < |d\_2Gr/d\_3Gr| < 1.5 \tag{4}$$

where d_2Gr: the amount of movement of the second lens group during focusing from infinity to an arbitrary object distance, and d_3Gr: the amount of movement of the third lens group during focusing from infinity to an arbitrary object distance.

Conditional expression (4) defines the ratio of the amount of focusing movement between the second lens group and the third lens group. When the power exceeds the lower limit of the conditional expression (4), the amount of movement of the second lens group during focusing does not become too small, and fluctuations in field curves and coma aberration during focusing can be effectively corrected. When the power falls below the upper limit of the conditional expression (4), the amount of movement of the third lens group during focusing does not become too small, fluctuations in field curves due to focusing can be effectively corrected by driving the third lens group toward the image at the time of focusing.

Regarding the first lens groups, the following conditional expression (5) is preferably satisfied.

$$0.1 < d\_npr1/f1 < 0.6 \quad (5)$$

where d_npr1: the distance along the optical axis from the lens surface of the first lens group closest to the image to the rear principal point of the first lens group, and f1: the focal length of the first lens group.

The conditional expression (5) defines the position of the rear principal point of the first lens group. It is preferable that the rear principal point of the first lens group be closer to the image with respect to the lens of the first lens group closest to the image. When the power falls below the upper limit of the conditional expression (5), the principal points of the first and second lens groups can be brought close to each other, and an increase in the positive refractive power of the second lens group can be suppressed; thus, fluctuations in spherical aberrations due to focusing can be suppressed. When the power exceeds the lower limit of the conditional expression (5), an increase in the negative refractive power of the third lens group can be suppressed; thus, fluctuations in field curves due to focusing can be suppressed.

The following conditional expression (5a) is more preferably satisfied.

$$0.3 < d\_npr1/f1 < 0.6 \quad (5a)$$

The conditional expression (5a) defines a more preferable conditional range based on the aforementioned viewpoints, within the conditional range defined by the conditional expression (5). Therefore, when the conditional expression (5a) is preferably satisfied, the aforementioned effects can be enhanced.

It is preferable that the second lens group comprise at least one negative lens and at least one positive lens. The second lens group including a negative lens and a positive lens has a configuration advantageous for correcting the coma aberration of off-axis light.

In the second lens group, it is more preferable that the negative lens and the positive lens be arranged in this order from the object side. With the negative lens and the positive lens arranged in this order from the object side, once the light flux from the first lens group is diverged and then converged, the coma aberration of the off-axis light can be more effectively reduced.

It is preferable that the lens surface of the second lens group closest to the object be concave on the object side. With a negative lens concave on the object side, the light flux from the first lens group is gently diverged, so that a sudden fluctuation in aberration due to focusing can be suppressed.

It is preferable that the second lens group comprise at least one aspherical surface lens. With an aspherical surface lens in the second lens group, various aberrations caused by focusing, particularly fluctuations in field curves can be suppressed.

It is preferable that the second lens group include a positive lens satisfying the following conditional expression (6).

$$\theta g, F-(-0.0018vd+0.6484) > 0.009 \quad (6)$$

where $\theta g, F$: a partial dispersion ratio of a lens material, $\theta g, F = (Ng-NF)/(NF-NC)$ Ng: a refractive index for g line, NF: a refractive index for F line, NC: a refractive index for C line, and vd: an Abbe number related to the d line of the lens material.

The conditional expression (6) defines the abnormality dispersion of the positive lens in the second lens group. When the conditional expression (6) is satisfied, fluctuations in axial chromatic aberrations due to focusing can be effectively reduced. Further, when the lens having the strongest positive refractive power in the second lens group satisfies the conditional expression (6), the chromatic aberration correction effect can be maximized.

It is preferable that the lens of the third lens group closest to the object be concave on the object side. When the lens of the third lens group closest to the object is concave on the object side, fluctuations in field curves due to focusing can be effectively suppressed.

It is preferable that a stop be disposed between the first lens group and the second lens group. With a stop between the first lens group and the second lens group, an increase in the effective aperture of the second lens group is suppressed and the weight of the second lens group can thus be reduced, leading to an increase in focusing speed. Further, with groups having positive refractive power facing each other with the stop therebetween, the configuration can be made advantageous for reducing coma aberrations.

The imaging lens described above is suitable for use as an imaging lens for a digital device with an image input function (for example, an interchangeable lens digital camera). A combination of this imaging lens and an imaging element and the like can constitute an imaging optical device that optically captures an image of a subject and outputs it in the form of an electric signal. The imaging optical device is an optical device that is the main component of a camera used to capture still images or moving images of a subject, and includes, for example, an imaging lens that forms an optical image of the object, and an imaging element (image sensor) that converts the optical image formed by the imaging lens into an electric signal, in this order from the object (i.e., the subject) side. When the imaging lens having the above-described characteristic configuration is positioned so that an optical image of the subject is formed on the light receiving surface (that is, the imaging surface) of the imaging element, a compact, low-cost, and high-performance imaging optical device and a digital device including the same can be achieved.

Examples of digital devices with an image input function include digital cameras, video cameras, surveillance cameras, security cameras, in-vehicle cameras, and videophone cameras. Other examples include personal computers, portable digital devices (for example, mobile phones, smartphones (high-functionality mobile phones), tablet terminals, and mobile computers), peripheral devices thereof (for example, scanners, printers, and mice), and other digital devices (for example, dashboard cameras and defense equipment) which are provided with an internal or external cameral function. As seen from these examples, a camera can be configured with an imaging optical device and a camera function can also be added by providing an imaging optical device to various equipment. For example, a digital device with an image input function such as a camera-equipped mobile phone can be configured.

Figure 17:
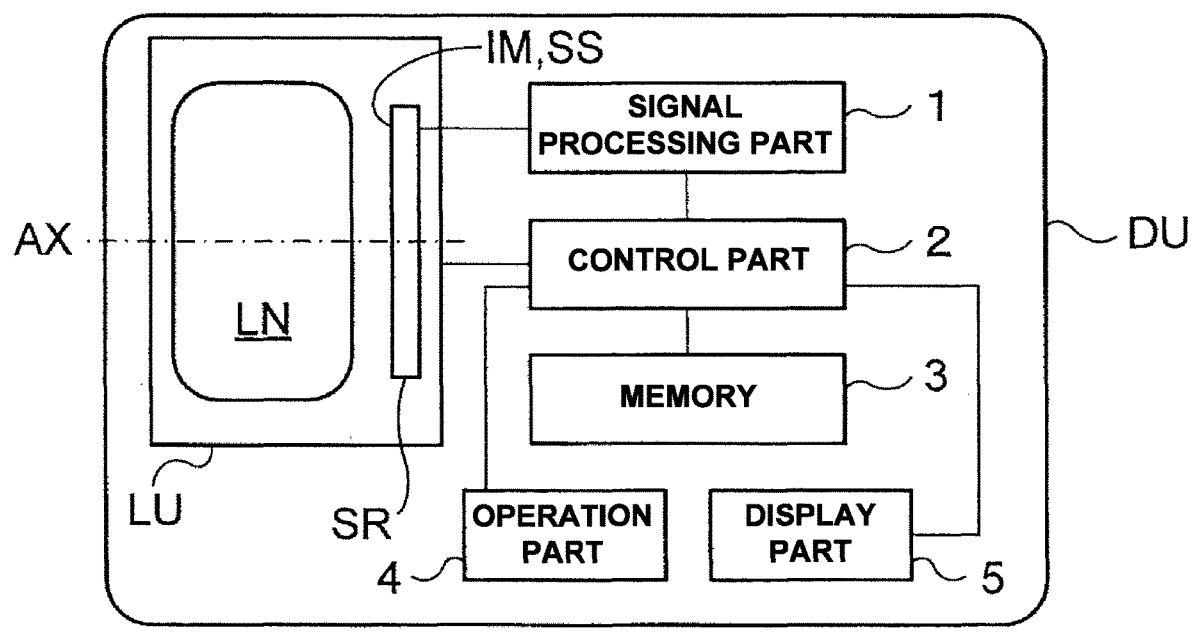
FIG. 17 is a schematic view showing an example schematic configuration of a digital device equipped with an imaging optical device.

FIG. 17 is a schematic cross-sectional view showing an example schematic configuration of a digital device DU as an example of digital device with an image input function. The imaging optical device LU mounted on the digital device DU shown in FIG. 17 includes, in order from the object (i.e., subject) side, an imaging lens LN (AX: optical axis) that forms an optical image (image plane) IM of the object; and an imaging element SR for converting the optical image IM formed on the light receiving surface (imaging surface) SS by the imaging lens LN into an electric signal, and is also provided with a parallel plane plate (corresponding to, for example, a cover glass of the imaging element SR; or an optical filter such as an optical low-pass filter or an infrared cut filter that is provided as needed) as needed.

When a digital device DU with an image input function is constituted by the imaging optical device LU, the imaging optical device LU is usually located inside its body; however, an appropriate form is adopted to implement the camera function. For example, the unitized imaging optical device LU may be made rotatable with respect to the main body of the digital device DU, and the unitized imaging optical device LU as an interchangeable lens with an image sensor may be detachably attached to the main body of the digital device DU (that is, an interchangeable lens camera).

The imaging lens LN is, for example, a wide-angle single focus lens consisting of at least three groups, and is configured to perform focusing on a close object and form an optical image IM on the light receiving surface SS of the imaging element SR by moving the second lens group of positive refractive power and the third lens group of negative refractive power along the optical axis AX with the first lens group fixed in position (i.e., fixed in position with respect to the image surface IM). The imaging element SR may be, for example, a solid-state imaging element, such as a charge coupled device (CCD) image sensor with a plurality of pixels or a complementary metal-oxide semiconductor (CMOS) image sensor. Since the imaging lens LN is provided so that the optical image IM of the subject is formed on the light receiving surface SS, which is a photoelectric conversion unit of the imaging element SR, the optical image IM formed by the imaging lens LN is converted into an electrical signal by the imaging element SR.

The digital device DU includes a signal processing part 1, a control part 2, a memory 3, an operation part 4, and a display part 5, in addition to the imaging optical device LU. The signal generated by the imaging element SR is subjected to predetermined digital image processing, image compression processing, and the like in the signal processing part 1 as needed, and is recorded as a digital video signal in the memory 3 (for example, a semiconductor memory or optical disk). In some cases, the data is transmitted to another device via a cable or after being converted into an infrared signal or the like (for example, a communication function of a mobile phone). The control part 2 consists of a microcomputer, and intensively performs, for example, control over functions including a photographing function (for example, still image photographing function or moving image photographing function) and an image reproducing function; and control over a lens moving mechanism for focusing, camera shake correction, and the like. For example, the control part 2 controls the imaging optical device LU so as to capture at least one of a still image and a moving image of a subject. The display part 5 includes a display such as a liquid crystal monitor, and displays an image using an image signal converted by the imaging element SR or image data recorded in the memory 3. The operation part 4 includes operation members such as an operation button (for example, a release button) and an operation dial (for example, a photographing mode dial), and transmits information input by an operator to the control part 2.

Figure 18:
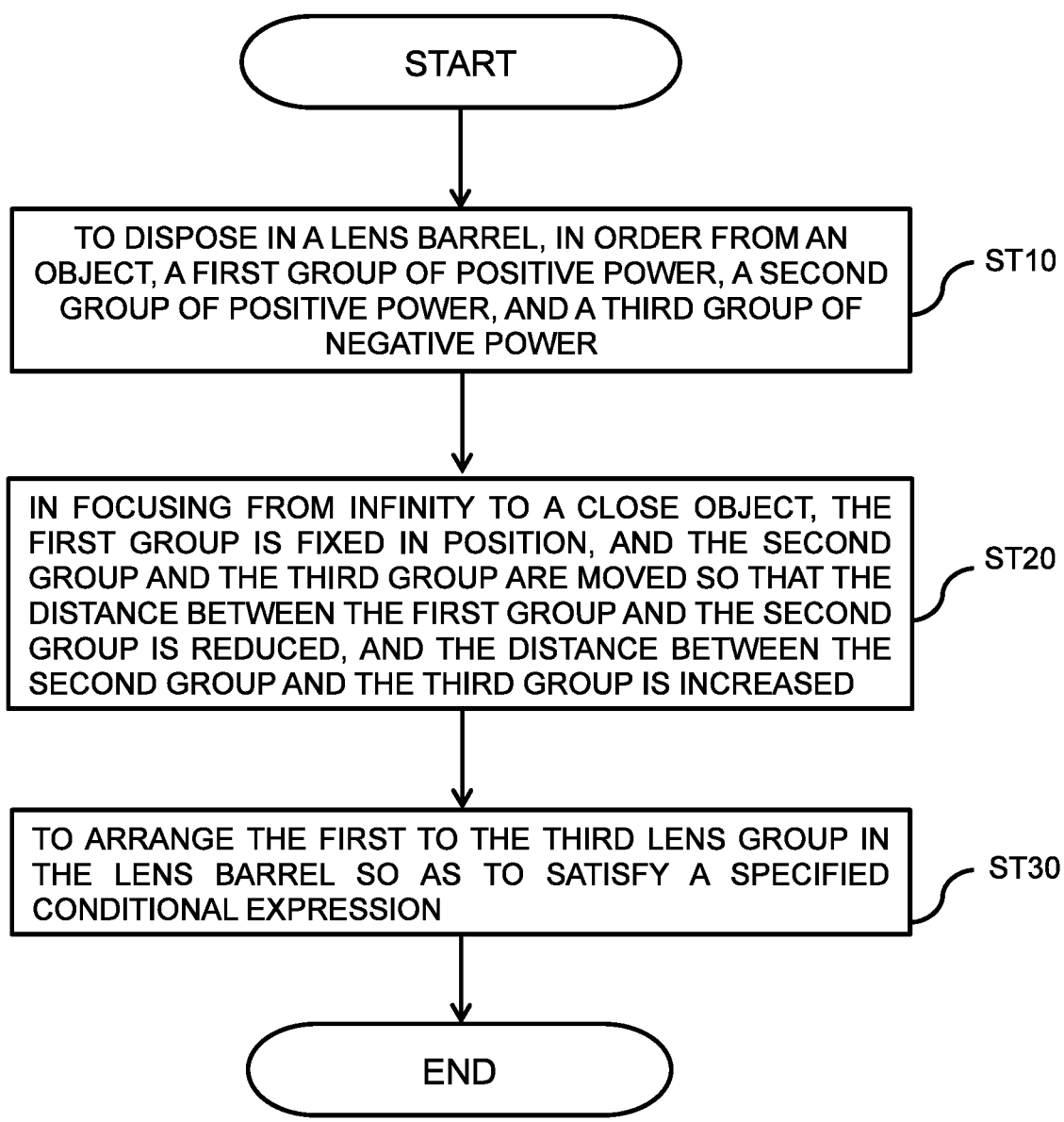
FIG. 18 is a flowchart showing a method of manufacturing an imaging lens.

A method of manufacturing the imaging lens LN having the aforementioned configuration will now be described with reference to FIG. 18. In this manufacturing method, in order from the object side, the first lens group of positive refractive power, the second lens group of positive refractive power, and the third lens group of negative refractive power are arranged in the lens barrel (Step ST10). At this time, in focusing from infinity to a close object, settings are made so that the second lens group and the third lens group move so that the first lens group is fixed in position, the distance between the first lens group and the second lens group is reduced, and the distance between the second lens group and the third lens group is increased (Step ST20). Further, the first to third lens groups are positioned in a lens barrel so that the following conditional expression (1) is satisfied (Step ST30).

$$1.0 < f1/f < 2.5 \tag{1}$$

where f1: the focal length of the first lens group, and f: the focal length of the entire system.

The specific optical configuration of the imaging lens LN will be described in more detail with reference to the first to fourth embodiments of the imaging lens LN. FIGS. 1 to 4 are lens configuration diagrams respectively corresponding to the imaging lenses LN constituting the first to fourth embodiments, and show the lens arrangement at a point at infinity in an optical cross section. Note that a parallel plane plate PT is disposed between the imaging lens LN and the image plane IM, and the parallel plane plate PT is a glass plate with a thickness equivalent to the total optical thickness of a cover glass of the imaging element SR and a low-pass filter for preventing moiré.

The first to fourth embodiments each has, in order from the object side, a positive/positive/negative three-group structure consisting of a first lens group Gr1 of positive refractive power, a second lens group Gr2 of positive refractive power, and a third lens group Gr3 of negative refractive power, which is a suitable configuration for a compact, wide-angle, large-aperture single focus interchangeable lens. In FIGS. 1 to 4, L1 # (#=1, 2, . . . , 8) is the #-th lens from the object side in the first lens group Gr1, L2 # (#=1, 2, 3) is the #-th lens from the object side in the second lens group Gr2, and L31 is one lens constituting the third lens group Gr3.

In the first to fourth embodiments, in focusing from the first focusing position POS1 (infinity end: at a point at infinity) to the second focusing position POS2 (close-up end: at a close-up point), the second lens group Gr2 and the third lens group Gr3 which are a focusing group move along the optical axis AX so that the first lens group Gr1 is fixed in position with respect to the image plane IM, the distance between the first lens group Gr1 and the second lens group Gr2 is reduced, and the distance between the second lens group Gr2 and the third lens group Gr3 is increased. Note that the arrows m1, m2, and m3 indicate the paths of the first lens group Gr1, the second lens group Gr2, and the third lens group Gr3, respectively, and a stop (aperture stop) ST disposed between the first lens group Gr1 and the second lens group Gr2, and the parallel plane plate PT disposed on the image plane IM side of the imaging lens LN are fixed in focusing position together with the first lens group Gr1.

In the first to fourth embodiments, the floating focusing method is employed as described above, and in focusing from the infinity end to the close-up end, the second lens group Gr2 moves toward the object side, while the third lens group Gr3 moves toward the image side. When the second lens group Gr2 and the third lens group Gr3 are made move in the opposite directions during focusing and the distance between the second lens group Gr2 and the third lens group Gr3 is increased as described above, fluctuations in aberrations such as field curves during focusing can be advantageously canceled out by the second lens group Gr2 and the third lens group Gr3. Therefore, aberration degradation during focusing can be more effectively corrected, and the image quality at the close-up end POS2 can be further enhanced.

The imaging lens LN (FIG. 1) of the first embodiment has a positive/positive/negative three-group structure, and each group has the following configuration. The first lens group Gr1 consists of, in order from the object side, a negative meniscus lens L11 concave on the image side; a cemented lens consisting of a positive meniscus lens L12 convex on the object side and a negative meniscus lens L13 concave on the image side; a cemented lens consisting of a biconcave negative lens L14 and a biconvex positive lens L15; and a cemented lens consisting of a biconvex positive lens L16 and a negative meniscus lens L17 concave on the object side. The second lens group Gr2 consists of, in order from the object side, a negative meniscus lens L21 concave on the object side, a biconvex positive lens L22, and a positive meniscus lens L23 (both surfaces are aspherical) convex on the image side. The third lens group Gr3 consists of a negative meniscus lens L31 concave on the object side.

The imaging lens LN (FIG. 2) of the second embodiment has a positive/positive/negative three-group structure, and each group has the following configuration. The first lens group Gr1 consists of, in order from the object side, a negative meniscus lens L11 concave on the image side; a cemented lens consisting of a biconcave negative lens L12 and a positive meniscus lens L13 convex on the object side; a cemented lens consisting of a biconcave negative lens L14 and a biconvex positive lens L15; a biconvex positive lens L16; and a cemented lens consisting of a biconvex positive lens L17 and a biconcave negative lens L18. The second lens group Gr2 consists of, in order from the object side, a negative meniscus lens L21 concave on the object side, a biconvex positive lens L22, and a positive meniscus lens L23 (both surfaces are aspherical) convex on the image side. The third lens group Gr3 consists of a biconcave negative lens L31.

The imaging lens LN (FIG. 3) of the third embodiment has a positive/positive/negative three-group structure, and each group has the following configuration. The first lens group Gr1 consists of, in order from the object side, a negative meniscus lens L11 concave on the image side; a cemented lens consisting of a positive meniscus lens L12 convex on the object side and a negative meniscus lens L13 concave on the image side; a cemented lens consisting of a biconcave negative lens L14 and a biconvex positive lens L15; a biconvex positive lens L16 (both surfaces are aspherical); and a cemented lens consisting of a biconvex positive lens L17 and a biconcave negative lens L18. The second lens group Gr2 consists of, in order from the object side, a negative meniscus lens L21 (both surfaces are aspherical) concave on the object side, a biconvex positive lens L22, and a positive meniscus lens L23 (both surfaces are aspherical) convex on the image side. The third lens group Gr3 consists of a planoconcave negative lens L31 concave on the object side.

The imaging lens LN (FIG. 4) of the fourth embodiment has a positive/positive/negative three-group structure, and each group has the following configuration. The first lens group Gr1 consists of, in order from the object side, a negative meniscus lens L11 concave on the image side; a cemented lens consisting of a biconvex positive lens L12 and a biconcave negative lens L13; a cemented lens consisting of a biconcave negative lens L14 and a biconvex positive lens L15; a biconvex positive lens L16; and a negative meniscus lens L17 (both surfaces are aspherical) concave on the image side. The second lens group Gr2 consists of, in order from the object side, a negative meniscus lens L21 concave on the object side, a biconvex positive lens L22, and a positive meniscus lens L23 convex on the image side (both surfaces are aspherical). The third lens group Gr3 consists of a negative meniscus lens L31 (both surfaces are aspherical) concave on the object side.

EXAMPLES

The configuration and the like of an imaging lens in which the present invention is implemented will now be described in more detail with reference to the construction data and the like of Examples. Examples 1 to 4 (EXs 1 to 4) given here are numerical examples corresponding to the above-described first to fourth embodiments, respectively, and lens configuration diagrams (FIGS. 1 to 4) showing the first to fourth embodiments show the respective optical configurations of Examples 1 to 4.

In the construction data of each example, as surface data, surface number i (OB: object surface, ST: stop, IM: image plane), in order from the left columns, paraxial radius of curvature ri (mm), axial surface distance di (mm), refractive index nd related to the d-line (wavelength: 587.56 nm), Abbe number vd related to the d-line, and effective radius Ri (mm).

A surface with * added to the surface number i is an aspherical surface with a surface shape defined by the following equation (AS) using a local rectangular coordinate system (x, y, z) whose origin is the surface vertex. An aspherical surface coefficient and the like will be shown as the aspherical surface data. In the aspherical surface data of each example, the coefficient of a term without a notation is 0, and E-n=×10$^{-n}$ for all data.

$$z=(c \cdot h^2)/[1+\{1-(1+K) \cdot c^2 \cdot h^2\}^{1/2}]+\Sigma(Aj \cdot h^j) \quad (AS)$$

where h: the height ($h^2=x^2+y^2$) in the direction perpendicular to the z-axis (optical axis AX), z: the amount of sag in the optical axis AX direction at the height h (based on surface vertex), c: a curvature at the surface vertex (reciprocal of curvature radius ri), K: a conical constant, and Aj: j-order aspherical surface coefficient.

Shown as various data are the focal length f (mm) of the entire system, F number (FNO), entire angle of view 2ω (°), entire lens length TL (the distance from the surface of the imaging lens LN closest to the object to the image plane IM (without air equivalent), mm), and back focusing BF (the distance from the image-side surface of the parallel plane plate PT to the image plane IM, mm). Moreover, shown as variable parameters changed by focusing are the stop aperture (effective radius) Ri and the variable axial surface distance di for the first focusing position POS1 (at a point at infinity) and the second focusing position POS2 (at a close-up point). Further, the amount of movement d_2Gr of the second lens group Gr2 and the amount of movement d_3Gr of the third lens group Gr3 during focusing from the first focusing position POS1 to the second focusing position POS2 are also shown, and Table 1 shows the conditional expression corresponding values of the examples, and Table 2 shows data related to the conditional expressions.

FIGS. 5 to 8 are longitudinal aberration graphs for Examples 1 to 4 (EXs 1 to 4), respectively, in which (A) to (C) show various aberrations in the first focusing position POS1, and (D) to (F) show various aberrations in the second focusing position POS2. In FIGS. 5 to 8, (A) and (D) are spherical aberration graphs, (B) and (E) are astigmatism graphs, and (C) and (F) are distortion graphs.

Each spherical aberration graph shows the amount of spherical aberration with respect to the C line (wavelength: 656.28 nm) indicated by the dot-dash line, the amount of spherical aberration with respect to the d line (wavelength: 587.56 nm) indicated by the solid line, and the amount of spherical aberration with respect to the g line (wavelength: 435.84 nm) indicated by the dashed line, all in the amount of shift (mm) from the paraxial image plane in the optical axis AX direction. The vertical axis represents the value of the height of light incident on the pupil normalized by its maximum height (i.e., the relative pupil height). In each astigmatism graph, the dashed line T represents a tangential image plane with respect to the d line, and the solid line S represents a sagittal image plane with respect to the d line, all in the amount of shift (mm) from the paraxial image plane in the optical axis AX direction. The vertical axis represents the image height (IMG HT, mm). In each distortion graph, the horizontal axis represents distortion (%) with respect to the d line, and the vertical axis represents the image height (IMG HT, mm). Note that the maximum value of the image height IMG HT is equal to the maximum image height on the image plane IM.

FIGS. 9, 11, 13 and 15 are lateral aberration graphs for Examples 1 to 4 (EXs 1 to 4), respectively at the first focusing position POS1, and FIGS. 10, 12, 14 and 16 are lateral aberration graphs for Examples 1 to 4 (EXs 1 to 4), respectively at the second focusing position POS2. In each of FIGS. 9 to 16, the left column shows the lateral aberration (mm) in a tangential light flux, and the right column shows the lateral aberration (mm) in a sagittal light flux. The lateral aberration at an image height ratio (half angle of view ω°) represented by RELATIVE FIELD HEIGHT is indicated by the C line (wavelength: 656.28 nm) indicated by the dot-dash line, the d line (wavelength: 587.56 nm) indicated by the solid line, and the g line (wavelength: 435.84 nm) indicated by the dashed line. Note that an image height ratio is a relative image height obtained by normalizing the image height IMG HT with the maximum image height.

Example 1

EXAMPLE 1

Unit: mm
Surface Data

| i | ri | di | nd | vd | Ri |
|---|---|---|---|---|---|
| 0(OB) | ∞ | d0 | | | |
| 1 | 5.2674 | 0.102 | 1.51680 | 64.12 | 0.847 |
| 2 | 0.9607 | 0.309 | | | 0.696 |
| 3 | 1.4420 | 0.246 | 1.90270 | 35.72 | 0.661 |
| 4 | 10.2799 | 0.083 | 1.59550 | 39.21 | 0.625 |
| 5 | 1.2154 | 0.411 | | | 0.546 |
| 6 | −1.0987 | 0.088 | 1.69900 | 30.05 | 0.524 |
| 7 | 2.9183 | 0.258 | 1.91080 | 35.25 | 0.586 |
| 8 | −1.6693 | 0.009 | | | 0.601 |
| 9 | 1.6429 | 0.379 | 1.59280 | 68.62 | 0.624 |
| 10 | −1.4116 | 0.069 | 1.72050 | 34.70 | 0.613 |
| 11 | −2.5725 | 0.118 | | | 0.607 |
| 12 | (ST) ∞ | d12 | | | R12 |
| 13 | −0.9730 | 0.051 | 1.59280 | 35.31 | 0.476 |
| 14 | −24.0801 | 0.009 | | | 0.490 |
| 15 | 2.3756 | 0.282 | 1.59280 | 68.62 | 0.543 |
| 16 | −1.3055 | 0.239 | | | 0.569 |
| 17* | −7.3169 | 0.122 | 1.69350 | 53.20 | 0.604 |
| 18* | −2.2000 | d18 | | | 0.627 |
| 19 | −1.5449 | 0.083 | 1.48750 | 70.44 | 0.662 |
| 20 | −7.2572 | d20 | | | 0.712 |
| 21 | ∞ | 0.074 | 1.51680 | 64.12 | 1.200 |
| 22 | ∞ | BF | | | 1.200 |
| 23(IM) | ∞ | | | | |

Aspherical Surface Data

| i | 17 | 18 |
|---|---|---|
| K | 0 | 0 |
| A4 | −2.400E−01 | −5.053E−02 |
| A6 | −4.268E−01 | −3.491E−01 |
| A8 | 0.000E+00 | 1.459E−01 |
| A10 | 0.000E+00 | 7.718E−02 |
| A12 | 0.000E+00 | 0.000E+00 |

Various Data

| | |
|---|---|
| f | 1.57 |
| FNO | 1.85 |
| 2ω | 64.9 |
| TL | 4.483 |
| BF | 0.0425 |

Variable Parameter

| Distance | d0 | R12 | d12 | d18 | d20 |
|---|---|---|---|---|---|
| ∞ | (POS1) | 0.555 | 0.604 | 0.154 | 0.750 |
| 7.1 mm | (POS2) | 0.530 | 0.376 | 0.587 | 0.545 |

Movement Amount of Group (POS1→POS2)

| Gr2 | Gr3 |
|---|---|
| −0.228 | 0.206 |

Example 2

Unit: mm
Surface Data

| i | ri | di | nd | vd | Ri |
|---|---|---|---|---|---|
| 0(OB) | ∞ | d0 | | | |
| 1 | 5.2537 | 0.102 | 1.66446 | 35.91 | 0.975 |
| 2 | 0.9322 | 0.551 | | | 0.758 |
| 3 | −30.4018 | 0.092 | 1.62004 | 36.30 | 0.737 |
| 4 | 1.9408 | 0.224 | 1.92286 | 20.88 | 0.719 |
| 5 | 24.9372 | 0.235 | | | 0.707 |
| 6 | −1.8836 | 0.092 | 1.69895 | 30.05 | 0.686 |
| 7 | 2.6962 | 0.265 | 1.83481 | 42.72 | 0.699 |
| 8 | −3.2039 | 0.009 | | | 0.701 |
| 9 | 2.1418 | 0.231 | 1.88300 | 40.76 | 0.670 |
| 10 | −7.1415 | 0.009 | | | 0.648 |
| 11 | 1.7434 | 0.281 | 1.83481 | 42.72 | 0.566 |
| 12 | −1.8840 | 0.060 | 1.69895 | 30.05 | 0.526 |
| 13 | 1.4348 | 0.191 | | | 0.444 |
| 14(ST) | ∞ | d14 | | | R14 |
| 15 | −0.7488 | 0.055 | 1.75520 | 27.53 | 0.361 |
| 16 | −2.4434 | 0.024 | | | 0.375 |
| 17 | 2.3343 | 0.269 | 1.59282 | 68.62 | 0.460 |
| 18 | −0.9873 | 0.109 | | | 0.491 |
| 19* | −5.8696 | 0.135 | 1.82080 | 42.71 | 0.524 |
| 20* | −1.9402 | d20 | | | 0.560 |
| 21 | −4.0712 | 0.092 | 1.72047 | 34.71 | 0.693 |
| 22 | 20.1119 | d22 | | | 0.676 |
| 23 | ∞ | 0.069 | 1.51680 | 64.14 | 1.200 |
| 24 | ∞ | BF | | | 1.200 |
| 25(IM) | ∞ | | | | |

Aspherical Surface Data

| i | 19 | 20 |
|---|---|---|
| K | 0 | 0 |
| A4 | −4.148E−01 | −1.172E−01 |
| A6 | −1.186E+00 | −9.748E−01 |
| A8 | 5.555E−01 | 1.023E+00 |
| A10 | 0.000E+00 | 0.000E+00 |
| A12 | 0.000E+00 | 0.000E+00 |

Various Data

| | |
|---|---|
| f | 1.14 |
| FNO | 1.85 |
| 2ω | 82.6 |
| TL | 4.414 |
| BF | 0.0448 |

Variable Parameter

| Distance | d0 | R14 | d14 | d20 | d22 |
|---|---|---|---|---|---|
| ∞ | (POS1) | 0.416 | 0.387 | 0.120 | 0.760 |
| 7.14 mm | (POS2) | 0.400 | 0.299 | 0.402 | 0.565 |

Movement Amount of Group (POS1→POS2)

| Gr2 | Gr3 |
|---|---|
| −0.088 | 0.194 |

Example 3

Unit: mm
Surface Data

| i | ri | di | nd | vd | Ri |
|---|---|---|---|---|---|
| 0(OB) | ∞ | d0 | | | |
| 1 | 2.5424 | 0.102 | 1.65844 | 50.85 | 1.054 |
| 2 | 0.9246 | 0.439 | | | 0.807 |
| 3 | 2.0808 | 0.190 | 1.92286 | 20.88 | 0.776 |
| 4 | 3.5916 | 0.102 | 1.48749 | 70.32 | 0.737 |
| 5 | 1.1233 | 0.453 | | | 0.650 |
| 6 | −1.5692 | 0.092 | 1.67270 | 32.17 | 0.624 |
| 7 | 1.1681 | 0.404 | 1.88100 | 40.14 | 0.643 |
| 8 | −3.0812 | 0.027 | | | 0.638 |
| 9* | 1.7767 | 0.211 | 1.82080 | 42.71 | 0.587 |
| 10* | −7.1583 | 0.029 | | | 0.570 |
| 11 | 3.1208 | 0.229 | 1.84850 | 43.79 | 0.533 |
| 12 | −1.8099 | 0.060 | 1.69895 | 30.05 | 0.512 |
| 13 | 1.7205 | 0.179 | | | 0.464 |
| 14(ST) | ∞ | d14 | | | R14 |
| 15* | −0.9487 | 0.055 | 1.83441 | 37.28 | 0.398 |
| 16* | −3.3164 | 0.033 | | | 0.416 |
| 17 | 3.1258 | 0.267 | 1.59282 | 68.62 | 0.426 |
| 18 | −0.8904 | 0.206 | | | 0.450 |
| 19* | −4.1856 | 0.132 | 1.74330 | 49.33 | 0.485 |
| 20* | −1.8713 | d20 | | | 0.566 |
| 21 | −4.0518 | 0.081 | 1.74077 | 27.76 | 0.580 |
| 22 | ∞ | d22 | | | 0.693 |
| 23 | ∞ | 0.074 | 1.51480 | 64.14 | 0.713 |
| 24 | ∞ | BF | | | 1.200 |
| 25(IM) | ∞ | | | | |

Aspherical Surface Data

| i | 9 | 10 | 15 |
|---|---|---|---|
| K | 0 | 0 | 0 |
| A4 | 1.636E−02 | 5.124E−02 | −4.036E−01 |
| A6 | 2.187E−02 | 1.402E−02 | −2.480E−01 |
| A8 | 4.840E−03 | 7.649E−03 | 1.966E−01 |
| A10 | 0.000E+00 | 0.000E+00 | 0.000E+00 |
| A12 | 0.000E+00 | 0.000E+00 | 0.000E+00 |

| i | 16 | 19 | 20 |
|---|---|---|---|
| K | 0 | 0 | 0 |
| A4 | −7.313E−02 | 1.200E−01 | 2.110E−01 |
| A6 | 1.763E−01 | 1.845E−01 | 2.880E−01 |
| A8 | 7.632E−01 | −7.940E−02 | 1.652E−01 |
| A10 | 0.000E+00 | 0.000E+00 | −1.677E−01 |
| A12 | 0.000E+00 | 0.000E+00 | 0.000E+00 |

Various Data

| | |
|---|---|
| F | 1.14 |
| FNO | 1.85 |
| 2ω | 82.7 |
| TL | 4.736 |
| BF | 0.0448 |

Variable Parameter

| Distance | d0 | R14 | d14 | d20 | d22 |
|---|---|---|---|---|---|
| ∞ | (POS1) | 0.439 | 0.347 | 0.176 | 0.813 |
| 6.58 mm | (POS2) | 0.419 | 0.264 | 0.484 | 0.587 |

Movement Amount of Group (POS1→POS2)

| Gr2 | Gr3 |
|---|---|
| −0.083 | 0.226 |

Example 4

Unit: mm
Surface Data

| i | ri | di | nd | vd | Ri |
|---|---|---|---|---|---|
| 0(OB) | ∞ | d0 | | | |
| 1 | 4.6232 | 0.102 | 1.51680 | 64.13 | 0.832 |
| 2 | 0.8784 | 0.354 | | | 0.673 |
| 3 | 4.0730 | 0.258 | 1.95375 | 32.33 | 0.657 |
| 4 | −2.0290 | 0.083 | 1.60342 | 38.03 | 0.640 |
| 5 | 3.2358 | 0.108 | | | 0.569 |
| 6 | −1.2945 | 0.172 | 1.68893 | 31.16 | 0.548 |
| 7 | 1.7517 | 0.329 | 1.85150 | 40.78 | 0.631 |
| 8 | −1.7517 | 0.018 | | | 0.645 |
| 9 | 1.1917 | 0.368 | 1.49700 | 81.61 | 0.653 |
| 10 | −3.5528 | 0.009 | | | 0.631 |
| 11* | 4.1556 | 0.057 | 1.83441 | 37.28 | 0.587 |
| 12* | 1.9836 | 0.187 | | | 0.557 |
| 13(ST) | ∞ | d13 | | | R13 |
| 14 | −0.9917 | 0.062 | 1.61293 | 36.94 | 0.478 |
| 15 | −5.7790 | 0.012 | | | 0.495 |
| 16 | 2.1244 | 0.282 | 1.59282 | 68.62 | 0.544 |
| 17 | −1.3918 | 0.209 | | | 0.562 |
| 18* | −8.4171 | 0.098 | 1.69350 | 53.20 | 0.599 |
| 19* | −2.8176 | d19 | | | 0.614 |
| 20* | −1.8973 | 0.083 | 1.58313 | 59.46 | 0.645 |
| 21* | −6.9348 | d21 | | | 0.704 |
| 22 | ∞ | 0.074 | 1.51680 | 64.13 | 1.200 |
| 23 | ∞ | BF | | | 1.200 |
| 24(IM) | ∞ | | | | |

Aspherical Surface Data

| i | 11 | 12 | 18 |
|---|---|---|---|
| K | −4.9288 | −0.4693 | 15.3255 |
| A4 | −9.582E−02 | −8.355E−02 | −2.063E−01 |
| A6 | 5.043E−01 | 5.689E−01 | 6.890E−02 |
| A8 | −4.618E−01 | −2.913E−01 | 0.000E+00 |
| A10 | 0.000E+00 | 0.000E+00 | 0.000E+00 |
| A12 | 0.000E+00 | 0.000E+00 | 0.000E+00 |

| i | 19 | 20 | 21 |
|---|---|---|---|
| K | −0.9347 | −0.1889 | 0 |
| A4 | −2.416E−03 | −1.143E−01 | −9.359E−02 |
| A6 | 1.158E−01 | −1.549E−01 | −1.873E−01 |
| A8 | 1.983E−01 | 0.000E+00 | 1.909E−01 |
| A10 | −1.130E−01 | 0.000E+00 | −1.298E−01 |
| A12 | 0.000E+00 | 0.000E+00 | 0.000E+00 |

Various Data

| F | 1.57 |
|---|---|
| FNO | 1.85 |
| 2ω | 64.9 |
| TL | 4.553 |
| BF | 0.0425 |

Variable Parameter

| Distance | d0 | R13 | d13 | d19 | d21 |
|---|---|---|---|---|---|
| ∞ | (POS1) | 0.533 | 0.514 | 0.229 | 0.751 |
| 7.0 mm | (POS2) | 0.509 | 0.283 | 0.666 | 0.545 |

Movement Amount of Group (POS1→POS2)

| Gr2 | Gr3 |
|---|---|
| −0.230 | 0.206 |

TABLE 1

| Conditional Expression Corresponding Value | (1) f1/f | (2) f2/f | (3) \|f3/f2\| | (4) \|d_2Gr/ d_3Gr\| | (5) d_npr1/ f1 | (6) θg, F − (−0.0018 vd + 0.6484) |
|---|---|---|---|---|---|---|
| EX1 | 1.18 | 1.62 | 1.59 | 1.11 | 0.52 | 0.019(L22) |
| EX2 | 1.41 | 1.58 | 2.61 | 0.45 | 0.45 | 0.019(L22) |
| EX3 | 1.70 | 1.62 | 2.97 | 0.37 | 0.49 | 0.019(L22) |
| EX4 | 1.33 | 1.60 | 1.79 | 1.12 | 0.46 | 0.019(L22) |

TABLE 2

| Data associated with Conditional Expression | EX1 | EX2 | EX3 | EX4 |
|---|---|---|---|---|
| f(mm) | 1.572 | 1.137 | 1.136 | 1.572 |
| f1(mm) | 1.851 | 1.605 | 1.931 | 2.089 |
| f2(mm) | 2.550 | 1.799 | 1.841 | 2.512 |
| f3(mm) | −4.043 | −4.692 | −5.470 | −4.507 |
| d_npr1(mm) | 0.958 | 0.723 | 0.940 | 0.969 |
| θg, F(L22) | 0.5441 | 0.5441 | 0.5441 | 0.5441 |
| vd(L22) | 68.62 | 68.62 | 68.62 | 68.62 |

EXPLANATION OF NUMERALS AND CHARACTERS

DU Digital device
LU Imaging optical device
LN Imaging lens
Gr1 First lens group
Gr2 Second lens group
Gr3 Third lens group
L1# #-th lens in first lens group from object side (#=1, 2, . . . , 8)
L2# #-th lens in second lens group from object side (#=1, 2, 3)
L31 Lens constituting third lens group
ST Stop
SR Imaging element
SS Light receiving surface (imaging surface)
IM Image plane (optical image)
AX Optical axis
1 Signal processing part
2 Control part
3 Memory
4 Operation part
5 Display part

RELATED APPLICATIONS

This is a continuation of PCT International Application No. PCT/JP2018/041421, filed on Nov. 8, 2018, which is hereby incorporated by reference. This application also claims the benefit of Japanese Patent Application No. 2017-220250, filed in Japan on Nov. 15, 2017, which is hereby incorporated by reference.

The invention claimed is:
1. An imaging lens comprising:
in order from an object, a first lens group having a positive refractive power, a second lens group having a positive refractive power, and a third lens group having a negative refractive power, wherein
in focusing from infinity to a close object, the first lens group is fixed in position, the second lens group is moved toward the object, and the third lens group is moved toward an image, whereby the distance between the first lens group and the second lens group is reduced, and the distance between the second lens group and the third lens group is increased, the first lens group comprises, in order from the object, a negative lens, a first cemented lens adjacent to the negative lens, and a second cemented lens adjacent to the first cemented lens, the second lens group consists of three lenses, the third lens group consists of one negative lens, and the following conditional expressions (1) and (4) are satisfied:

$$1.0 < f1/f < 2.5 \qquad (1)$$

$$0.1 < |d\_2Gr/d\_3Gr| < 1.5 \qquad (4)$$

where f1: is the focal length of the first lens group, f: the focal length of the entire system when focused on infinity, d_2Gr: the amoumt of movement of the second lens group during focusing from infinity to an arbitrary object distance, and d_3Gr: the amount of movement of the third lens group during focusing from infinity to an arbitrary object distance.

2. The imaging lens according to claim 1, wherein the following conditional expression (2) is satisfied:

$$1.2 < f2/f < 3.0 \qquad (2)$$

where f2: the focal length of the second lens group.

3. The imaging lens according to claim 1, wherein the following conditional expression (3) is satisfied:

$$1.2 < |f3/f2| < 4.0 \qquad (3)$$

where f2: the focal length of the second lens group, and f3: the focal length of the third lens group.

4. The imaging lens according to claim 1, wherein the following conditional expression (5) is satisfied:

$$0.1 < d\_npr1/f1 < 0.6 \qquad (5)$$

where d_npr1: the distance along an optical axis from the lens surface of the first lens group closest to the image to the rear principal point of the first lens group.

5. The imaging lens according to claim 1, wherein the second lens group comprises at least one negative lens and at least one positive lens.

6. The imaging lens according to claim 1, wherein the second lens group comprises a positive lens that satisfies the following conditional expression (6):

$$\theta g, F - (-0.0018 vd + 0.6484) > 0.009 \qquad (6)$$

where

θg, F: a partial dispersion ratio of a lens material,

θg, F=(Ng−NF)/(NF−NC)

Ng: a refractive index for g line,

NF: a refractive index for F line,

NC: a refractive index for C line, and vd: an Abbe number related to the d line of the lens material.

7. The imaging lens according to claim 1, wherein the lens of the third lens group closest to an object is concave on the object side.

8. The imaging lens according to claim 1, wherein a stop is disposed between the first lens group and the second lens group.

9. An imaging optical device comprising:

the imaging lens according to claim 1; and an imaging element that converts an optical image formed on an imaging surface of the imaging element to an electrical signal, wherein the imaging lens is provided so that an optical image of a subject is formed on an imaging surface of the imaging element.

10. A digital device operative to capture at least one of a still image and a moving image of a subject and comprising the imaging optical device according to claim 9.

11. A method of manufacturing an imaging lens which comprises, in order from an object, a first lens group having a positive refractive power, a second lens group having a positive refractive power, and a third lens group having a negative refractive power, the method comprising arranging the first to third lens groups in a lens barrel such that:

in focusing from infinity to a close object, the first lens group is fixed in position, the second lens group is moved toward the object, and the third lens group is moved toward an image, whereby the distance between the first lens group and the second lens group is reduced, and the distance between the second lens group and the third lens group is increased, the first lens group comprises, in order from the object, a negative lens, a first cemented lens adjacent to the negative lens, and a second cemented lens adjacent to the first cemented lens, the second lens group consists of three lenses, the third lens group consists of one negative lens, and the following conditional expressions (1) and (4) are satisfied:

$$1.0 < f1/f < 2.5 \qquad (1)$$

$$0.1 < |d\_2Gr/d\_3Gr| < 1.5 \qquad (4)$$

where f1: is the focal length of the first lens group, f: the focal length of the entire system when focused on infinity, d_2Gr: the amoumt of movement of the second lens group during focusing from infinity to an arbitrary object distance, and d_3Gr: the amount of movement of the third lens group during focusing from infinity to an arbitrary object distance.

* * * * *